United States Patent
Kaya

(10) Patent No.: US 11,385,343 B1
(45) Date of Patent: Jul. 12, 2022

(54) RADAR DEVICE

(71) Applicant: WaveArrays Inc., Amagasaki (JP)

(72) Inventor: Nobuyuki Kaya, Amagasaki (JP)

(73) Assignee: WaveArrays Inc., Hyogo (JP)

( * ) Notice: Subject to any disclaimer, the term of this patent is extended or adjusted under 35 U.S.C. 154(b) by 0 days.

(21) Appl. No.: 17/159,467

(22) Filed: Jan. 27, 2021

(30) Foreign Application Priority Data

Dec. 21, 2020 (JP) .............................. JP2020-211004
Jan. 20, 2021 (JP) .............................. JP2021-007018

(51) Int. Cl.
*G01S 13/42* (2006.01)
*G01S 7/03* (2006.01)
(Continued)

(52) U.S. Cl.
CPC ............ *G01S 13/426* (2013.01); *G01S 7/032* (2013.01); *G01S 7/35* (2013.01); *G01S 15/42* (2013.01); *G01S 2013/0245* (2013.01)

(58) Field of Classification Search
CPC ...... G01S 13/931; G01S 13/42; G01S 13/426; G01S 13/4463; G01S 13/87; G01S 7/03;
(Continued)

(56) References Cited

U.S. PATENT DOCUMENTS

2010/0164784 A1\* 7/2010 Longstaff ............... H01Q 21/08
342/202
2010/0204867 A1 8/2010 Longstaff
(Continued)

FOREIGN PATENT DOCUMENTS

CN 111555015 8/2020
JP 2001221854 A 8/2001
(Continued)

OTHER PUBLICATIONS

Nobuyuki Kaya, New Receiving Ground Antenna Using Active Phased Array Antenna for Satellites, In proceedings of "67th International Astronautical Congress(IAC 2016)", 2016, p. 3159-3162.

(Continued)

*Primary Examiner* — Olumide Ajibade Akonai
(74) *Attorney, Agent, or Firm* — Simpson & Simpson, PLLC; S. Peter Konzel, Esq.

(57) ABSTRACT

A radar device capable of detecting a location of an object using a phased-array antenna capable of receiving a reflected wave from all directions includes one or more linear array antennae and a controller capable of transmitting of a wave T from one or more linear array antennae, and receiving a reflected wave R at the one or more linear array antennae. At least one linear array antennae is the same and/or is different from a linear array antenna that transmits the transmitting wave T, and the reflected wave R being generated by the transmitting wave T illuminating the object. A location of the object is estimated using time from transmission of transmitting wave T to reception of reflected wave R, and a direction of the transmitting wave and/or using a frequency of the transmitting wave and a frequency of the reflected wave, and the direction of the transmitting wave.

10 Claims, 18 Drawing Sheets

(51) Int. Cl.
*G01S 15/42* (2006.01)
*G01S 13/02* (2006.01)
*G01S 7/35* (2006.01)

(58) Field of Classification Search
CPC .. G01S 7/032; G01S 13/88; G01S 2013/0254; G01S 2013/0245; G01S 7/35; G01S 15/42; G01S 13/872; G01S 13/003; H01Q 1/3233; H01Q 21/08; H01Q 3/2629
See application file for complete search history.

(56) References Cited

U.S. PATENT DOCUMENTS

| | | | |
|---|---|---|---|
| 2011/0285582 | A1 | 11/2011 | Zhang et al. |
| 2018/0217251 | A1* | 8/2018 | Stanley .................. G01S 13/89 |
| 2018/0348343 | A1* | 12/2018 | Achour .................. G01S 7/354 |
| 2019/0293788 | A1* | 9/2019 | Madia .................. G01S 13/426 |
| 2019/0346559 | A1* | 11/2019 | Eljarat .................. G01S 13/42 |
| 2020/0158861 | A1* | 5/2020 | Cattle .................. G01S 7/032 |
| 2020/0200892 | A1* | 6/2020 | Rajab .................. G01S 13/82 |
| 2020/0300965 | A1* | 9/2020 | Wu .................. G01S 13/931 |
| 2021/0096216 | A1* | 4/2021 | Rigazio .................. G06V 20/52 |
| 2021/0239788 | A1* | 8/2021 | Arage .................. G01S 13/931 |

FOREIGN PATENT DOCUMENTS

| | | |
|---|---|---|
| JP | 2002267746 A | 9/2002 |
| JP | 2010529450 | 8/2010 |
| JP | 2016090431 | 5/2016 |
| JP | 2018105770 A | 7/2018 |
| WO | 2008149100 A1 | 12/2008 |

OTHER PUBLICATIONS

Tinh Nguyen Dinh et al: "An Investigation on Amplitude Distribution for Controlling Side-Lobe Level of Sparse Cylindrical Sonar Arrays", 2020 International Conference On Green and Human Information Technology (ICGHIT), IEEE, Feb. 5, 2020 (Feb. 5, 2020), pp. 45-46, XP033749448, DOI: 10.1109/ICGHIT49656.2020. 00018 [retrieved on Apr. 6, 2020].
Davies Den et al: "Cylindrical arrays with electronic beam scanning", Proc. IEE, vol. 112, No. 3, Mar. 1, 1965 (Mar. 1, 1965), pp. 497-505, XP001387730.

\* cited by examiner

RADAR DEVICE

On 2020, Ministry of Internal Affairs and Communications, R & D consignment business in the information and communication field (Strategic Information and Communications R&D Promotion Programme strategic information and communication R & D promotion program: SCOPE), patent application subject to Article 17 of the Japanese Industrial Technology Strengthening Law.

TECHNICAL FIELD

The present invention relates to a radar device.

BACKGROUND ART

A radar device employs an array antenna having a plurality of antenna elements arranged therein. An array antenna is usable as a phased-array antenna by being configured to be able to control a phase of a radio wave transmitted and received by an antenna element, the phased array antenna being capable of performing a process of changing a direction of the array antenna by controlling the phase of the radio wave transmitted and received. Since a radar device with a phased-array antenna is able to orient an antenna, the radar device may make field intensity (which is also referred to as an "antenna gain". Hereinafter, the field intensity of radio waves radiated by an antenna is simply referred to as a "gain".) of radio waves radiated by the antenna in a direction to which the antenna is oriented higher than the field intensity of a radar device that does not orient an antenna. Therefore, a detection available distance of the radar device may be lengthened.

The phased-array antenna is able to change the direction of the antenna without using a mechanical structure for changing an antenna direction, the mechanical structure being exemplified by a rotating table to which the antenna is attachable, or the like. Therefore, the phased-array antenna is able to change the direction of the antenna in a shorter time than a case where the antenna direction is changed through the use of the mechanical structure. In addition, since the mechanical structure is not necessary, the phased-array antenna may make an antenna structure simpler than the case where the antenna direction is changed through the use of the mechanical structure. This makes it possible to easily change the direction of antenna, even if an antenna is attached to a device, such as a man-made satellite, etc., that has a wide variety of problems related to changing of the antenna direction through the use of the mechanical structure.

By using the phased-array antenna capable of changing the direction of orientation in a short time, a radar device that scans a wide area in a short time may be configured. Therefore, the use of the phased-array antenna may configure the radar device capable of scanning a wide area in a short time and specifying a location of an observed object, or the like, located in the area.

For the radar device with the phased-array antenna, a phased-array antenna having antenna elements disposed in a plane (hereinafter, also simply referred to as a "planar phased-array antenna") is widely used. However, the planar phased-array antenna has a problem that the gain decreases and the detection available distance shortens when receiving a radio wave in a direction away from a direction of a normal of the plane. To solve the problem, various measures have been taken to specify the location of the observed object in the wide area through the use of the phased-array antenna.

As an example of the measures, Non-Patent Literature 1 discloses a phased-array antenna that is configured by using eight poles having a multitude of antenna elements.

CITATION LIST

Non-Patent Literature

Non-Patent Literature 1: Nobuyuki Kaya, "NEW RECEIVING GROUND ANTENNA USING ACTIVE PHASED ARRAY ANTENNA FOR SATELLITES", (In proceedings of "$67^{th}$ International Astronautical Congress (IAC 2016)"), 2016, p. 3159-3162.

SUMMARY OF THE INVENTION

Problems to be Solved by the Invention

According to Non-Patent Literature 1, since eight poles having a multitude of antenna elements are used, it is possible to receive radio waves from a wider area than a case where a planar phased-array antenna is used. However, Non-Patent Literature 1 only discloses a receiving phased-array antenna that receives a radio wave and does not disclose a specific method or the like for configuring a radar device using the receiving phased-array antenna. In general, a radar device specifies a location of an observed object by receiving a reflected wave with a receiving antenna, the reflected wave being generated by a transmitting wave illuminating the observed object, and the transmitting wave being transmitted by a transmitting antenna. In order to specify the location of the observed object in a wider area, a configuration of the antenna for transmission to be used in combination with the receiving antenna is important.

In a radar device of the prior art, various types of antennae such as a linear antenna, a parabola antenna, and/or a planar phased-array antenna or the like are used as an antenna for transmission for transmitting a transmitting wave. The radar device may further increase a gain in a reflected wave and further lengthen a detection available distance, by orienting the antenna for transmission and the receiving antenna in the same direction. As such, the location of observed object in an even wider area may be estimated.

A pole antenna disclosed by Non-Patent Literature 1 is configured by disposing a multitude of antenna elements on poles. The pole antenna (which is also called as a "linear array antenna" because antenna elements are arrayed linearly along the poles, and hereinafter simply referred to as the "linear array antenna") is used by being oriented to a direction in which the gain of radio waves from a conical surface area to the antenna is large, the conical surface area having a longitudinal direction of the antenna as a central axis. The "conical surface area" used herein is an area that includes a side surface of a cone and an area adjacent to the side surface and that does not include the inside of the cone. In contrast, the aforementioned various types of antennae are used by being oriented to a direction in which the gain of radio waves from a linear range to the antenna is large. As such, it is not easy to orient the aforementioned various types of antennae to the same direction as the direction to which the phased-array antenna of Non-Patent Literature 1 is oriented. Hence, there is a further problem to be solved when the radar device is configured by combining the phased-array antenna of Non-Patent Literature 1 with the antenna for transmission.

The present invention has been made in view of such circumstances. An objective of the present invention is to provide a radar device that is able to instantly estimate a location of an observed object in a wide area, by using a phased-array antenna capable of receiving a reflected wave from a wider area than a case where a planar phased-array antenna is used.

Means for Solving the Problems

As a result of diligent study of the aforementioned problems, the inventors have found that it is possible to achieve the aforementioned objective by making processes feasible, and have completed the present invention, the processes including a linear array antenna transmitting a transmitting wave; the linear array antenna receiving a reflected wave, the reflected wave being generated by the transmitting wave illuminating an observed object; and estimating a location of the observed object by using time from transmission of the transmitting wave to reception of the reflected wave and direction of the transmitting wave, and/or by using a frequency of the transmitting wave, a frequency of the reflected wave, and the direction of the transmitting wave. Specifically, the present invention provides the following.

An invention according to a first characteristic provides a radar device that includes one or more linear array antennae and a controller, the controller being able to perform a process of at least the one or more linear array antennae transmitting a transmitting wave; a process of at least the one or more linear array antenna receiving a reflected wave, at least the one or more linear array antenna being the same as and/or different from the linear array antenna that transmits the transmitting wave and the reflected wave being generated by the transmitting wave illuminating an observed object; and a process of estimating a location of the observed object by using time from transmission of the transmitting wave to reception of the reflected wave, and the direction of the transmitting wave, and/or by using a frequency of the transmitting wave and a frequency of the reflected wave, and the direction of the transmitting wave.

First, it is described that the linear array antenna is able to receive the reflected wave from a wider area than a planar phased-array antenna or the like. In general, the planar phased-array antenna is controlled so that the gain of reflected wave toward the antenna from a linear range along a direction to which the planar phased-array antenna is oriented is large. This allows the planar phased-array antenna to receive the reflected wave towards the antenna from the linear range in the direction to which the planar phase array antenna is oriented.

In contrast to this, it is possible to control the linear array antenna in a direction in which the gain of the reflected wave toward the antenna from a conical surface area having a longitudinal direction of the linear array antenna as a central axis is large. This allows the linear array antenna to receive the reflected wave from the conical surface area in a direction of orientation towards the antenna. Then, the conical surface area is wider than the linear range. Therefore, according to the invention related to the first characteristic, the phased-array antenna may be configured that is able to receive the reflected wave from a wider area than a case where the planar phased-array antenna is used.

Subsequently, description is given of a direction of the antenna when transmitting the transmitting wave. The radar device may further increase the gain in the reflected wave and further lengthen the detection available distance, by orienting the antenna for transmission and the receiving antenna to the same direction. As such, the radar device may estimate the location of the observed object in an even wider area.

According to the invention related to the first characteristic, since the transmitting wave is transmitted by using the linear array antenna and the reflected wave is received by using the linear array antenna, the direction of the linear array antenna when transmitting the transmitting wave and the direction of the linear antenna when receiving the reflected waves may be made the same as a conical surface direction. Therefore, the gain related to the reflected wave may be increased and the detection available distance of the radar device may be made even longer. Hence, according to the invention related to the first characteristic, the location of the observed object in a wide area may be estimated.

Description is given of a process of the radar device estimating the location of the observed object. The direction from the linear array antenna to the location of the observed object where the reflected wave is generated is the same direction as the direction of the transmitting wave. According to the invention related to the first characteristic, the transmitting wave is transmitted by using the linear array antenna oriented to the conical surface direction. Therefore, the location of the observed object is included in this conical surface and a periphery thereof. The time from the transmission of the transmitting wave to the reception of the reflected wave varies depending on a distance from the linear array antenna to the location of the observed object. Therefore, the distance from the linear array antenna to the location of the observed object may be measured by using the time from the transmission of the transmitting wave to the reception of the reflected wave. If the transmitting wave is frequency modulated, a difference between the frequency of the transmitting wave and the frequency of the reflected wave varies depending on the distance from the linear array antenna to the location of the observed object. Therefore, the distance from the linear array antenna to the location of the observed object may be measured by using the difference.

A location of the apex of the conical surface is the same as that of the linear array antenna. Therefore, a space that is included in the conical surface and the periphery thereof and where the distance from the linear array antenna satisfies the measured distance is an approximately circular space. Therefore, it is possible to estimate that the location of the observed object is the location included in the aforementioned approximately circular space, by performing the process of estimating the location of the observed object by using the time from the transmission of the transmitting wave to the reception of the reflected wave and the direction of the transmitting wave, and/or by using the frequency of the transmitting wave, the frequency of the reflected wave, and the direction of the transmitting wave. According to the invention related to the first characteristic, the reflected wave from the location of the observed object in the conical surface area may be received approximately simultaneously, without changing the direction of the linear array antenna. Therefore, the location of the observed object in the conical surface area, which is wider than the linear range, may be estimated in a shorter time than a case where the direction of the linear array antenna is changed. As such, the location of the observed object in the wide area may be estimated instantly.

Hence, according to the invention related to the first characteristic, it is possible to provide the radar device that is able to instantly estimate the location of the observed object in a wide area, using the phased-array antenna capable of receiving the reflected wave from a wider area than a case where a planar phased-array antenna is used.

An invention according to a second characteristic is the invention according to the first characteristic, and provides a radar device in which the linear array antenna that transmits the transmitting wave is also the linear array antenna that receives the reflected wave in the process of receiving the reflected wave.

According to the invention related to the second characteristic, it is possible to receive the reflected wave at a location of the linear array antenna that transmits the transmitting wave. As such, the direction of the transmitting wave and the direction of the reflected wave match better than a case where the reflected wave is received at a different location from the linear array antenna that transmits the transmitting wave. Therefore, the gain related to the reflected wave may be increased without changing the direction of the linear array antenna between the transmission of the transmitting wave and the reception of the reflected wave. Consequently, the detection available distance of the radar device may be made even longer. Hence, according to the invention related to the second characteristics, the location of the observed object in a wide area may be estimated.

According to the invention related to the second characteristic, it is possible to transmit the transmitting wave without having another antenna for transmitting a transmitting wave. As such, the radar device may be configured to have a simpler structure than the radar having the other antenna for transmitting the transmitting wave. Hence, cost performance and/or maintainability or the like of the radar device may be improved.

Hence, according to the invention related to the second characteristic, it is possible to provide the radar device that is able to instantly estimate the location of the observed object in a wide area, using the phased-array antenna capable of receiving the reflected wave from a wider area than a case where a planar phased-array antenna is used.

An invention according to a third characteristic is the invention according to the first or second characteristic. The invention according to the third characteristic provides a radar device wherein the number of the linear array antennae is two or more, the two or more linear array antennae being disposed parallel to each other in a longitudinal direction, and wherein the process of receiving the reflected wave includes a process of at least the two or more linear array antennae receiving the reflected wave, and the process of estimating the location of the observed object includes a process of specifying two locations.

According to the invention related to the third characteristic, it is possible to specify an approximately circular space by using time until each of the two or more linear array antennae receive the reflected wave and/or each of frequencies of the reflected waves. It is possible to specify two intersecting points by using this approximately circular space, the time from the transmission of the transmitting wave to the reception of the reflected wave, and the direction of the transmitting wave, and/or by using the approximately circular space that is estimated by using the frequency of the transmitting wave, the frequency of the reflected wave, and the direction of the transmitting wave. Therefore, it is possible to configure so that the process of estimating the location of the observed object includes the process of specifying the two locations.

According to the invention related to the third characteristic, the two or more linear array antennae are disposed approximately parallel to each other in the longitudinal direction. This makes it possible to orient each of the two or more linear array antennae to the approximately the same direction. Therefore, each of the two or more linear array antennae is able to each increase the gain related to the reflected wave.

Hence, according to the invention related to the third characteristic, it is possible to provide the radar device that is able to instantly estimate the location of the observed object in a wide area, using the phased-array antenna capable of receiving the reflected wave from a wider area than a case where a planar phased-array antenna is used.

An invention according to a fourth characteristic is the invention according to the third characteristic, and provides a radar device wherein the linear array antenna that transmits the transmitting wave differs from the linear array antenna that receives the reflected wave.

According to the invention related to the fourth characteristic, it is possible to transmit the transmitting wave even when receiving the reflected wave. This may cause more transmitting waves to illuminate the observed object and generate more reflected waves. Therefore, more reflected waves may be received and the location of the observed object may be estimated even more reliably.

Hence, according to the invention related to the fourth characteristic, it is possible to provide the radar device that is able to instantly estimate the location of the observed object in a wide area, using the phased-array antenna capable of receiving the reflected wave from a wider area than a case where a planar phased-array antenna is used.

An invention according to a fifth characteristic is the invention according to the third or fourth characteristic. The invention according to the fifth characteristic provides a radar device wherein the transmitting wave is a frequency modulated transmitting wave, the linear array antenna that receives the reflected wave is the linear array antenna different from the linear array antenna that transmits the transmitting wave, and the controller is further able to perform a process of removing the transmitting wave from the reflected wave and a process of measuring the time using the frequency of the transmitting wave and the frequency of the reflected wave.

According to the invention related to the fifth characteristic, it is possible to continuously transmit the frequency modulated transmitting wave, and to receive the reflected wave with the linear array antenna different from the linear array antenna that transmits the transmitting wave. This may cause more transmitting waves to illuminate the observed object and generate more reflected waves.

In order to measure the time from the transmission of the transmitting wave to the reception of the reflected wave, it is necessary to identify when the transmitting wave that generates the reflected wave is transmitted. However, if a transmitting wave that is not frequency modulated is transmitted continuously, it is difficult to identify when the transmitting wave that generates the reflected wave is transmitted. Therefore, if the transmitting wave that is not frequency modulated is transmitted continuously, it may be difficult to measure the time from the transmission of the transmitting wave to the reception of the reflected wave. According to the invention related to the fifth characteristic, since the frequency modulated transmitting wave is transmitted, it may be identified when the transmitting wave that generates the reflected wave is transmitted, by using the frequency of the transmitting wave and the frequency of the reflected wave. This makes it possible to measure the time from the transmission of the transmitting wave to the reception of the reflected wave.

Therefore, according to the invention related to the fifth characteristic, generation of more reflected waves in the observed object and measurement of the time from the transmission of the transmitting wave to the reception of the reflected wave to may be achieved simultaneously. As such, more reflected waves may be received and the location of the observed object may be estimated even more reliably.

If the transmitting wave is transmitted continuously, the linear array antenna may also receive the transmitting wave when receiving reflected wave. The received transmitting wave may become noise in processing using the reflected wave. According to the invention according to the fifth characteristic, the process of removing the transmitting wave from the reflected wave may be performed, thereby preventing the received transmitting wave from becoming noise.

Hence, according to the invention related to the fifth characteristic, it is possible to provide the radar device that is able to instantly estimate the location of the observed object in a wide area, using the phased-array antenna capable of receiving the reflected wave from a wider area than a case where a planar phased-array antenna is used.

An invention according to a sixth characteristic is the invention according to any of the first to fifth characteristics. The invention according to the sixth characteristic provides a radar device wherein the number of the linear array antennae is three or more, the three or more linear array antennae being disposed to each other in the longitudinal direction, and wherein the process of receiving the reflected wave includes a process of at least the three or more linear array antennae receiving the reflected wave, and the process of estimating the location of the observed object includes the process of specifying the location of the observed object.

According to the invention related to the sixth characteristic, it is possible to specify three or more approximately circular spaces by using the reflected waves received by each of the three or more linear array antennae. Then, it is possible to specify the location of the observed object by using an intersecting point of these three or more approximately circular spaces.

According to the invention related to the sixth characteristic, the three or more linear array antennae are disposed parallel to each other in the longitudinal direction. This may orient each of the three or more linear array antennae to the approximately the same direction. Therefore, each of the three or more linear array antennae may improve the gain related to the reflected wave.

Hence, according to the invention related to the sixth characteristic, it is possible to provide the radar device that is able to instantly estimate the location of the observed object in a wide area, using the phased-array antenna capable of receiving the reflected wave from a wider area than a case where a planar phased-array antenna is used.

An invention according to a seventh characteristic is the invention according to any of the first to sixth characteristics, and provides a radar device wherein the controller is further able to perform a process of controlling the phase of the transmitting wave and the phase of the reflected wave to control the direction of the one or more linear array antennae to be a direction from the one or more linear array antennae toward the observed object.

According to the invention related to the seventh characteristic, by controlling the direction of the linear array antenna to be the direction from the one or more linear array antennae toward the observed object, the gain of the transmitting wave that illuminates the observed object may be further increased. Furthermore, the gain of the reflected wave to be received may be further increased. Since both the gain of the transmitting wave illuminating the observed object and the gain of the reflected wave may be increased, the detection available distance of the radar device may be made even longer. Therefore, the location of the observed object in an even wider area may be estimated.

Hence, according to the invention related to the seventh characteristic, it is possible to provide the radar device that is able to instantly estimate the location of the observed object in a wide area, using the phased-array antenna capable of receiving the reflected wave from a wider area than a case where a planar phased-array antenna is used.

An invention according to an eighth invention is the invention according to any of the first to seventh characteristic, and provides a radar device wherein the process of transmitting the transmitting wave includes a process of transmitting the transmitting wave intermittently.

According to the invention related to the eighth characteristic, since the transmitting wave is transmitted intermittently, the reflected wave may be easily associated with the transmitting wave that generates the reflected wave. This makes it possible to easily measure the time from the transmission of the transmitting wave to the reception of the reflected wave.

According to the invention related to the eighth characteristic, while the linear array antenna is not transmitting the transmitting wave, the reflected wave may be received by that linear array antenna. Therefore, it is possible to receive the reflected wave without having another antenna for receiving the reflected wave. As such, the radar device may be configured to have a simper structure than the radar device having another antenna for receiving the reflected wave. Hence, the cost performance and/or maintainability or the like of the radar device may be improved.

Hence, according to the invention related to the eighth characteristic, it is possible to provide the radar device that is able to instantly estimate the location of the observed object in a wide area, using the phased-array antenna capable of receiving the reflected wave from a wider area than a case where a planar phased-array antenna is used.

An invention according to ninth characteristic is the invention according to any of the first to eighth characteristics, and provides a radar device wherein the transmitting wave and the reflected wave include radio waves and/or sonic waves.

According to the invention related to the ninth characteristic, the transmitting wave including radio waves and/or sonic waves may be transmitted to a wide range without being affected by the atmosphere, clouds, and fog or the like that attenuate visible light rays. Further, the reflected wave including radio waves and/or sonic waves may be received from a wide range without being affected by the atmosphere, the clouds, and the fog or the like that attenuate the visible light rays. Therefore, it is possible to provide the radar device that is able to estimate the location of the observed object in an even wider area.

Hence, according to the invention related to the ninth characteristic, it is possible to provide the radar device that is able to instantly estimate the location of the observed object in a wide area, using the phased-array antenna capable of receiving the reflected wave from a wider area than a case where a planar phased-array antenna is used.

Effect of the Invention

According to the present invention, it is possible to provide a radar device that is able to instantly estimate a location of an observed object in a wide area, by using a phased-array antenna capable of receiving a reflected wave from a wider area than a case where a planar phased-array antenna is used.

MODES FOR CARRYING OUT THE INVENTION

In the following, description is given of an example of a preferred aspect for carrying out the present invention with reference to the figures. It is to be noted that this is merely an example and the technical scope of the present invention is not limited thereto.

First Embodiment

A radar device of a first embodiment is a radar device in which an antenna is a linear array antenna orientable in a conical surface shape.

<Radar Device 1>

Figure 1:
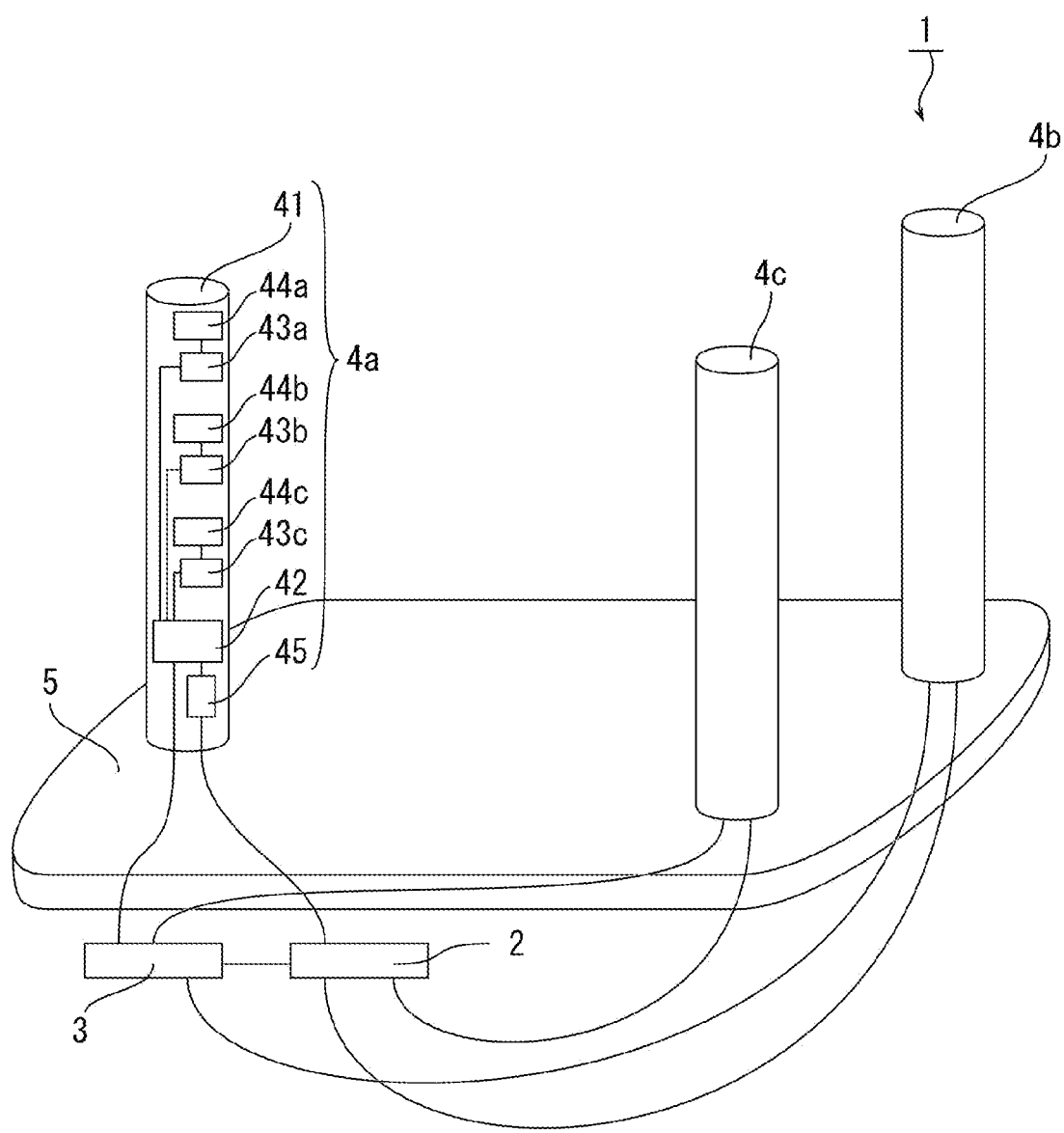
FIG. 1 is a schematic diagram of a radar device 1 in a first embodiment of the present invention, when it is viewed from diagonally above.

FIG. 1 is a schematic diagram of a radar device 1 in the first embodiment of the present invention when viewed from diagonally above. In the following, with reference to FIG. 1, description is given of an example of a preferred configuration of the radar device 1 in the first embodiment of the present invention.

The radar device 1 includes a controller 2, a transmitter 3, and one or more linear array antennae 4 (reference numerals 4a to 4c in FIG. 1). Each of the one or more linear array antennae 4 is a linear array antenna having antenna elements arranged to be arrayed linearly/in which antenna elements are arranged to be arrayed linearly.

It is possible to use a linear array antenna by orienting the antenna to a conical surface area, a central axis of the conical surface being a longitudinal direction of the antenna. The "conical surface area" as used herein is an area that includes a side surface of a cone and an area adjacent to the side surface and that does not include the inside of the cone. By orienting the antenna, it is possible to make intensity (which is also referred to as an "antenna gain". Hereinafter, the field intensity of radio waves radiated by an antenna is simply referred to as a "gain".) of waves radiated by the antenna in a direction to which the antenna is oriented. Further, by orienting the antenna, it is possible to improve efficiency of converting into a digital signal the reflected wave received from the direction in which the antenna is oriented.

It is preferable that the radar device 1 further include a support structure 5 capable of supporting the one or more linear array antennae 4, although it is not an essential aspect. Inclusion of the support structure 5 allows the one or more linear array antennae 4 to be supported by the support structure 5 so that each of these one or more linear array antennae 4 maintains a predetermined positional relationship. This makes it possible to easily perform a process of estimating a location of an observed object, which is described below.

[Controller 2]

The controller 2 controls the transmitter 3 and the one or more linear array antennae 4. The controller 2 also performs a location estimation process for specifying a space that includes the location of the observed object, by using time from when the one or more linear array antennae 4 transmit the transmitting wave until each of the one or more linear array antennae receives the reflected wave. The location estimation process to be performed by the controller 2 is described in detail below with reference to FIG. 3. Since the radar device 1 includes the controller 2, it is possible to perform the location estimation process and estimate the location of the observed object.

The controller 2 is not specifically limited. The controller 2 may be a prior-art microcomputer including, for example, a CPU (Central Processing Unit), a RAM (Random Access Memory), and a ROM (Read Only Memory) or the like.

The controller 2 is configured to be able to acquire each piece of reflected wave information regarding the reflected wave received by the one or more linear array antennae 4. Each piece of the reflected wave information includes information that allows for measurement of the time from when the linear array antenna 4 transmits the transmitting wave until the receiving linear array antenna 4 receives the reflected wave.

The controller 2 is configured to be able to change a direction of the linear array antenna 4 by controlling the phase of the transmitting wave and that of the reflected wave. As such, a direction of the transmitting wave may be controlled to be a direction from the linear array antenna 4 toward the observed object, and the efficiency of converting the reflected wave from the observed object into an electric signal in the linear array antenna 4 may be improved.

The controller 2 is preferably configured to be able to output the location of the observed object estimated by the location estimation process. Means for outputting the location of the observed object is not specifically limited, and may be various means used by a prior-art radar device to output the location of the observed object.

The controller 2 is preferably able to receive various instructions from a user who uses the radar device 1. Examples of various instructions include an instruction to start transmission of the transmitting wave, an instruction to stop the transmission of the transmitting wave, and/or an instruction to change the direction of the linear array antenna 4, or the like. Because the controller 2 is able to receive the various instructions from the user who uses the radar device 1, the radar device 1 may be controlled in response to the user's instruction.

[Transmitter 3]

The transmitter 3 is a transmitter capable of providing a transmission signal that causes the linear array antenna 4 to transmit the transmitting wave. The transmitter 3 is connected to the controller 2 and the one or more linear array antennae 4. The transmitter 3 is configured to be able to provide the one or more linear array antennae 4 with the transmission signal in accordance with the control of the controller 2. The transmitter 3 is not specifically limit and may be a transmitter of the prior art. The transmitter 3 may be a transmitter including, for example, an oscillator that oscillates a transmission signal and a modulator that modulates the transmission signal or the like. The radar device 1 including the transmitter 3 makes it possible to transmit the transmitting wave to the one or more linear array antennae 4 via the transmission signal.

The transmitter 3 is preferably able to provide a pulse wave transmission signal that causes transmission of a transmitting wave that is a pulse wave, although it is not an essential aspect. A pulse wave is a transmitting wave that is intermittently transmitted. Since the pulse wave is transmitted intermittently, it is easy to associate the transmitting wave with the reflected wave. As such, the time from the transmission of the transmitting wave to the reception of the reflected wave may be measured, by using time from transmission of the pulse wave to the reception of the reflected wave.

The transmitter 3 is preferably able to provide a chirp wave transmission signal that causes transmission of a transmitting wave that is a chirp wave, although it is not an essential aspect. A chirp wave is a transmitting wave that is transmitted intermittently, and that is a transmitting wave a frequency of which increases with time or a transmitting wave a frequency of which decreases with time. Since the frequency of the chirp wave increases or decreases with time, it is possible to measure elapsed time from the transmission of the chirp wave using the frequency of the chirp wave. This makes it possible to measure the time from the transmission of the transmitting wave to the reception of each reflected wave, by using the frequency of the reflected wave. Consequently, even if the chirp wave is transmitted for a longer period of time than the pulse wave, it is possible to accurately measure the time until the reflected wave is received. Therefore, it is possible to cause more transmitting waves to illuminate the observed object. Then, it is possible to cause more reflected waves to be generated in the observed object. Therefore, the linear array antenna 4 is able to receive more reflected waves than a case where the transmitting wave is the pulse wave. As such, the location of the observed object may be estimated more reliably.

A frequency modulated continuous wave (also referred to as a FM-CW) is a continuous wave a frequency of which is modulated. Since the frequency of the frequency modulated continuous wave is frequency modulated, it is possible to measure elapsed time from the transmission of the frequency modulated continuous wave, by using the frequency of the frequency modulated continuous wave.

The transmitter 3 is preferably able to provide a frequency modulated continuous wave transmission signal that causes the linear array antenna 4 to transmit a transmitting wave which is a frequency modulated continuous wave, although it is not an essential aspect. As such, it is possible to measure the time from the transmission of the transmitting wave to the reception of each reflected wave by using a comparison of the frequency of the transmitting wave and the frequency of the reflected wave.

The frequency modulated continuous wave is a continuous wave. Therefore, if the transmitting wave is the frequency modulated continuous wave, more transmitting waves may illuminate the observed object than a case where the transmitting wave is a pulse wave and/or a chirp wave. Then, more reflected waves may be generated in the observed object. Therefore, because the transmitter 3 is able to provide the frequency modulated continuous wave transmission signal, the linear array antenna 4 may receive more reflected ways than a case where the transmitting wave is a pulse wave and/or a chirp wave that is intermittently transmitted. As such, the location of the observed object may be estimated more reliably.

The transmitter 3 is preferably able to provide a wireless communication signal that causes the linear array antenna 4 to transmit a transmitting wave which is used in wireless communications, although it is not an essential aspect. This makes it possible to transmit to the linear array antenna 4 the transmitting wave to be used for wireless communications.

[Linear Array Antenna 4]

The linear array antenna 4 is a linear array antenna that is able to transmit a transmitting wave in accordance with a transmission signal provided from the transmitter 3 and to receive a reflected wave that is generated by the transmitting wave illuminating the observed object. Each of the one or more linear array antennae 4 includes a linear array antenna structure 41, a signal distributor 42, a plurality of phase shifters 43, a plurality of antenna elements 44, and a converter 45. If there is a plurality of the linear array antennae 4, the plurality of linear array antennae 4 are disposed so that respective longitudinal directions are approximately parallel to each other. Each of the one or more linear array antennae 4 is connected to the controller 2 and the transmitter 3. Each of the one or more linear array antennae 4 is configured to be controllable by the controller 2.

Because the radar device 1 includes the one or more linear array antennae 4, it is possible to receive reflected waves from a wider area than a planar phased-array antenna or the like. Because the radar device 1 includes the one or more linear array antennae 4, it is possible to perform the process of estimating the location of the observed object by using the time from the transmission of the transmitting wave to the reception of the reflected wave and a direction of the transmitting wave. The process of estimating the location of the observed object is described below in detail with reference to FIG. 7.

It is preferable that the number of the linear array antennae 4 be two or more, and these two or more linear array antennae 4 be disposed approximately parallel to each other in the longitudinal direction, although it is not an essential aspect. This makes it possible to perform a process of specifying two locations including the location of the observed object. The process of specifying the two locations including the location of the observed object is described below in detail with reference to FIG. 8.

It is preferable that the number of linear array antennae 4 be three or larger, and these three or more linear array antennae 4 be disposed approximately parallel to each other in the longitudinal direction, although it is not an essential aspect. This makes it possible to perform the process of specifying the location of the observed object. The process of specifying the location of the observed object is described below in detail with reference to FIG. 9. FIG. 1 illustrates a first linear array antenna 4a, a second linear array antenna 4b, and a third linear array antenna 4c which are disposed approximately parallel to each other in the longitudinal direction.

It is described that the linear array antenna 4 is able to receive the reflected waves from a wider area than the planar phased-array antenna or the like. In general, the planar phased-array antenna is controlled to efficiently receive the reflected waves toward the antenna from a linear region along the direction in which the planar phased-array antenna is oriented. As such, the planar phased-array antenna is able to receive the reflected waves towards the antenna from the linear region in the direction in which the planar phased-array antenna is oriented.

In contrast, it is possible to control the linear array antenna 4 to a direction in which the reflected waves toward the antenna from a conical surface area are efficiently received, the central axis of the conical surface area being the longitudinal direction of the linear array antenna 4. As such, the linear array antenna 4 may receive the reflected waves toward the antenna from the conical surface area in the direction in which the linear array antenna 4 is oriented. Then, the conical surface area is wider than the linear range. Therefore, because the radar device 1 includes the linear array antenna 4, the phased-array antenna may be configured that is able to receive the reflected wave from a wider area than the case where the planar phased-array antenna is used.

It is preferable that the number of the phase shifters 43 included in each of the one or more linear array antennae 4 be any of the number being one smaller than the number of the antenna elements 44, the number being the same as the number of the antenna elements 44, or the number being larger than the number of the antenna elements 44, although it is not an essential aspect. Because the number of the phase shifters 43 is any of these numbers, the phase of the transmitting wave transmitted by each of the plurality of the antenna elements 44 may be controlled. In addition, as such, the phase of a reflected wave received by each of the plurality of antenna elements 44 may be controlled. Therefore, the direction of the linear array antenna 4 may be controlled. Hereinafter, description is given as both of the number of the phase shifters 43 included and the number of the antenna elements in each of the one or more linear array antennae 4 being a predetermined number "np".

[Linear Array Antenna Structure 41]

The linear array antenna structure 41 is configured to be able to support various components included in the linear array antennae 4, such as the plurality of antenna elements 44. This makes it possible to dispose each of the plurality of antenna elements 44 so as to configure the linear array antenna.

[Signal Distributor 42]

The signal distributor 42 distributes transmission signals provided from the transmitter 3 and provides them to each of the plurality of phase shifters 43. Further, the signal distributor 42 synthesizes respective reflected waves provided via the respective phase shifters 43 and provides them to the converter 45.

The signal distributor 42 makes it possible to provide the transmission signal to each of the plurality of phase shifters 43 even when the transmitter 3 is not a transmitter capable of generating a plurality of transmission signals. Even when each of the reflected waves provided via each of the plurality of phase shifters 43 is weak, the signal distributor 42 may provide the converter 45 with a stronger reflected wave in a form of an analog signal, the stronger reflected wave being obtained by synthesizing these reflected waves.

The signal distributor 42 is a signal distributor that is also usable as a synthesizer. Hereinafter, a signal distributor also usable as a synthesizer is simply referred to as a "signal distributor" regardless of use thereof. The signal distributor 42 is not specifically limited, and may be a signal distributor of the prior art that is exemplified by, for example, a resistance distributor, a Wilkinson distributor, and a hybrid distributor or the like. The distributor 42 may be a distributor that is a combination of two or more distributors of the prior art.

The signal distributor 42 preferably includes a ladder-type distributor, among others. The ladder-type distributor is a distributor having a transformer, a first signal distributor transmission path, and p second signal distributor transmission paths. A characteristic impedance of the ladder-type distributor $Z_P[\Omega]$ is not specifically limited.

The first signal distributor transmission path is a transmission path end of which is connected to the transformer. The first signal distributor transmission path has an impedance of $Z_P/p[\Omega]$.

The p second signal distributor transmission paths are transmission paths connected to the first signal distributor transmission path with a gap of $d_P[m]$ from each other. Each of the p second signal distributor transmission paths is configured to be able to provide the phase shifter 43 for transmission with a transmission signal. Each of the p second signal distributor transmission paths has the impedance of $Z_P[\Omega]$.

Although the gap $d_P[m]$ is not specifically limited, it is preferable that the gap $d_P[m]$ be approximately the same as a wavelength $\lambda[m]$ of the transmission signal. Because the gap $d_P[m]$ is approximately the same as $\lambda[m]$, the phase of the transmission signal provided via the signal distributor 42 may be made approximately the same in the phase shifter 43 for transmission.

Although the number p of the second transmission paths is not specifically limited, the number p is preferably a number that satisfies $p=n_P$ or $p=n_P/2$. Because the number p of the second transmission paths is the number that satisfies $p=n_P$, the transmission signals may be distributed to the $n_P$ phase shifters 43 by the ladder type distributor. Further, the reflected wave provided by the $n_P$ phase shifters 43 may be synthesized by the ladder-type distributor. Because the number p of the second transmission paths is the number that satisfies $p=n_P$, the prior-art distributor capable of distributing the transmission signal into two and exemplified by the Wilkinson distributor or the like may be combined with the ladder type distributor to distribute the transmission signal to the $n_P$ phase shifters 43. Moreover, the prior-art distributor capable of synthesizing two reflected waves and exemplified by the Wilkinson distributor or the like may be combined with the ladder-type distributor to synthesize the reflected waves provided by the $n_P$ phase shifters 43.

The transformer is a transformer capable of changing a voltage and/or a current and is connected to the transmitter 3. The transformer has the impedance of $Z_P[\Omega]$. The transformer includes a signal distributor transmission path connection unit connected to the first signal distributor transmission path, an external connection unit connected to the transmitter 3 and the converter 45, and a signal distributor intermediate unit connecting the signal distributor transmission path connection unit and the external connection unit. The intermediate unit has a length of $d_p/p[m]$. The impedance $Z_{P0}[\Omega]$ of the signal distributor transmission path connection unit, the impedance $Z_{P1}[\Omega]$ of the signal distributor intermediate unit, and the impedance $Z_{P2}[\Omega]$ of the external connection unit satisfy the following expression (1):
[Mathematical Expression (1)]

$$Z_{P1} = \sqrt{Z_{P0} Z_{P2}} \quad (1)$$

Because the signal distributor 42 includes the ladder-type distributor, the transmission signals may be distributed to an arbitrary number of the phase shifters 43, while maintaining impedance matching. As such, if the predetermined number $n_P$ is a large number, the transmission signals may be distributed to the $n_P$ phase shifters 43, while maintaining the impedance matching.

Because the signal distributor 42 includes the ladder-type distributor, the reflected wave provided by the arbitrary number of phase shifters 43 may be synthesized, while maintaining the impedance matching. As such, if the predetermined number $n_P$ is a large number, the reflected waves provided by the arbitrary number of phase shifters 43 may be synthesized, while maintaining the impedance matching.

[Phase Shifter 43]

The phase shifters 43 is a phase shifter that controls the phase of a transmission signal distributed by the signal distributor 42 and provides it to the antenna element 44. The phase shifter 43 is also a phase shifter that controls the phase of the reflected wave provided from the antenna elements 44. The phase shifter 43 is configured to be controllable by the controller 2. The phase shifter 43 is not specifically limited, and may be a phase shifter of the prior art. By the phase shifter 43 controlling the phase of the transmission signal provided to the antenna element 44, the direction of a transmitting wave may be controlled. Further, by the phase shifter 43 controlling the phase of the reflected wave, the direction of the linear array antenna 4 may be controlled.

FIG. 1 illustrates a first phase shifter 43a, a second phase shifter 43b, and a third phase shifter 43c, as the phase shifter 43 included in the linear array antenna 4. Each of these phase shifters 43 is connected to the signal distributor 42.

[Antenna Element 44]

The antenna element 44 is an antenna element that transmits the transmitting wave on the basis of the transmission signal the phase of which is controlled by the phase shifter 43. The antenna element 44 is also an antenna element that receives the reflected wave generated by the transmitting wave illuminating the observed object. The antenna element 44 is able to provide the phase shifter 43 with the received reflected wave in the form of the analog signal.

The transmitting wave is not specifically limited as far as it is a wave that generates a reflected wave by illuminating the observed object. The reflected wave is not specifically limited as far as it is a wave that is generated by the transmitting wave illuminating the observed object. The transmitting wave and the reflected wave preferably include radio waves and/or sonic waves. Because the transmitting wave include radio waves and/or sonic waves, i the transmitting wave including radio wave and/or sonic wave may be transmitted to a wide area without being affected by the atmosphere, clouds, and fog or the like that attenuate visible light rays. Because the reflected wave includes radio waves and/or sonic waves, the reflected wave including radio waves and/or sonic waves may be received from a wide area without being affected by the atmosphere, clouds, and fog or the like that attenuate visible light rays. Therefore, it is possible to provide the radar device 1 capable of estimating the location of the observed object in an even wider area.

The antenna element 44 is disposed in the linear array antenna structure 41 so as to configure the linear array antenna along the longitudinal direction of the linear array antenna 4. The antenna element 44 allows for provision of the transmitting wave based on the transmission signal. The antenna element 44 allows for reception of the reflected wave.

The antenna element 44 is not specifically limited, and may be an antenna element configured by using a prior-art antenna capable of transmitting the transmitting wave and receiving the reflected wave. If the transmitting wave and the reflected wave include radio waves, the antenna element 44 preferably includes an antenna capable of transmitting and receiving radio waves. This makes it possible to transmit the transmitting wave including radio waves via the antenna element 44. It is also possible to receive reflected wave including radio waves by using the antenna element 44.

If the transmitting wave and the reflected wave include radio waves, the antenna element 44 preferably includes a speaker capable of generating sonic waves and a sonic wave sensor capable of receiving sonic waves. This makes it possible to transmit the transmitting waves including sonic waves via the antenna element 44. Further, it is possible to receive the reflected waves including sonic waves by using the antenna element 44. The speaker and the sonic wave sensor may be configured integrally or configured separately.

The antenna element 44 is preferably able to transmit and receive the transmitting wave used in wireless communications. As such, wireless communications may be performed using the radar device 1.

Figure 2:
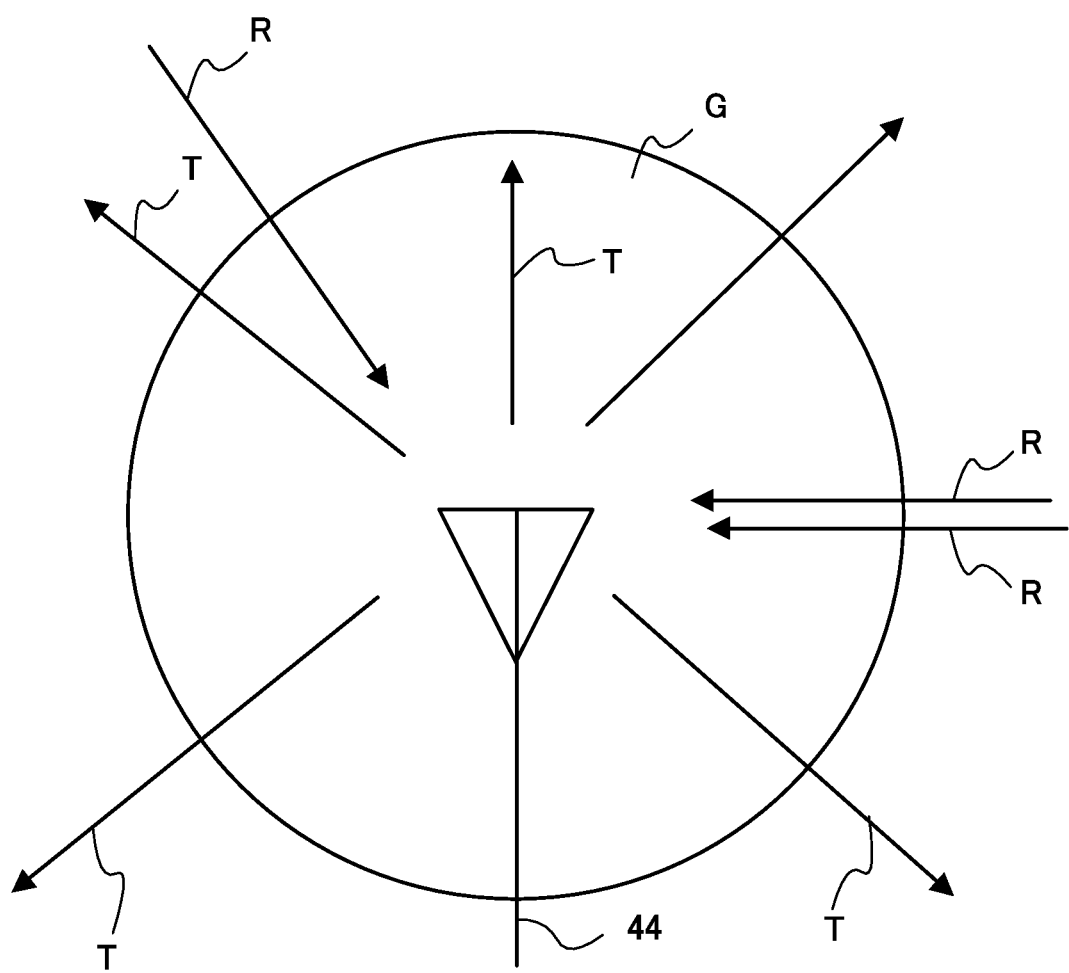
FIG. 2 is a conceptual diagram illustrating a transmitting wave T transmitted by an antenna element 44 and a reflected wave R received by the antenna element 44.

FIG. 2 is a conceptual diagram illustrating transmitting waves T transmitted by the antenna element 44 and reflected waves R received by the antenna element 44. The antenna element 44 is preferably configured by using an omnidirectional antenna capable of transmitting the transmitting waves T to all azimuth directions and receiving the reflected waves R from all azimuth directions. This makes it even easier to control the phase of the transmitting wave so as to direct the direction of the transmitting wave T to all azimuth directions. Further, this makes it possible to receive the reflected wave R regardless of an azimuth direction of the observed object as viewed from the antenna element 44.

The antenna element 44 is preferably a substantially non-directive antenna element, although it is not an essential aspect. The term "substantially no-directive" as used herein indicates that a gain G illustrated in FIG. 2 is approximately the same regardless of the azimuth direction viewed from the antenna element. If the transmitting wave T includes radio waves, the gain G as used herein is a ratio obtained by dividing the field intensity of the antenna in an azimuth direction viewed from the antenna element by the field intensity in the case of an isotropic antenna element. The upper limit of the gain G in the substantially non-directive antenna element is preferably 1.7 or lower, more preferably 1.5 or lower, and further preferably 1.3 or lower. By setting the upper limit of the gain G as described above, it becomes even easier to transmit the transmitting wave T to all azimuth directions. Further, it is possible to receive the reflected wave even more reliably, regardless of the azimuth direction of the observed object as viewed from the antenna element 44.

It is preferable that each of the plurality of antenna elements 44 be arranged with a predetermined arrangement gap $s_P$[m], although it is not an essential aspect. As such, the direction of the linear array antenna 4 may be controlled, by giving a predetermined phase difference $\alpha_P$ to each of the phase of the transmitting wave T and the phase of the reflected wave R transmitted by the two adjacent antenna elements 44.

[Converter 43]

The converter 45 converts the reflected wave R in the form of an analog signal provided from the signal distributor 42 into a digital signal. The converter 45 provides the controller 2 with this reflected wave R in the form of the digital signal. This makes it possible to provide the controller 2 with the reflected wave R in the form of the digital signal suitable for the location estimation process performed in the controller 2. The converter 45 is not specifically limited, and may be a converter capable of converting an analog signal of the prior art into a digital signal.

[Amplifier]

The linear array antenna 4 preferably includes one or more amplifiers (not illustrated), although it is not an essential aspect. The amplifier may be an amplifier that amplifies the transmission signal and/or the reflected wave R. Inclusion of the amplifier allows stronger transmitting waves T to be transmitted. In general, amplified reflected waves are easier to analyze than reflected waves that are not amplified. Therefore, the amplifier may make it easier to perform analysis of the reflected wave R. The amplifier is not specifically limited, and may be an amplifier of the prior art.

The upper limit of a noise factor of the amplifier is preferably 3 or lower, more preferably 2.5 or lower, and further preferably 2 or lower. By setting the upper limit of the noise factor of the amplifier as described above, the transmitting wave with less noise may be transmitted. This may reduce influence of noise in the process of estimating the location of the observed object. By setting the upper limit of the noise factor of the amplifier as described above, it is possible to obtain an amplified reflected wave R with less noise. This may reduce the influence of noise in the process of estimating the location of the observed object.

The amplifier is preferably able to amplify the transmission signal provided by the signal distributor 42. As such, if the intensity of the transmission signal decreases due to the distribution in the signal distributor 42, the transmission signal may be amplified and provided to the phase shifter. Then, it is possible to transmit a stronger transmitting wave. This makes it possible to make stronger the reflected wave R generated when the transmitting wave T illuminates the observed target. Therefore, it becomes easier to receive the reflected wave R.

If the amplifier is able to amplify the transmission signal provided by the signal distributor 42, the number of amplifiers included in each of the one or more linear array antennae 4 is preferably $n_P$ or more. As such, each of the transmission signals provided by the signal distributor 42 may be amplified and provided to the $n_P$ phase shifters 43.

The amplifier is preferably able to amplify reflected waves R provided by the antenna element 44. As such, the amplified reflected waves R may be provided to the phase shifter 43. If the amplifier is able to amplify the reflected waves R provided by the antenna element 44, the number of amplifiers included in each of the one or more linear array antennae 4 is preferably $n_P$ or more. As such, each of the reflected waves R provided by the $n_P$ antenna elements 44 may be amplified and provided to the $n_P$ phase shifters 43.

[Frequency Converter for Reception]

The linear array antenna 4 preferably includes one or more frequency converters (not illustrated), although it is not an essential aspect. The frequency converter is a frequency converter capable of converting the frequency of the transmission signal provided to the antenna element 44 and converting the frequency of the reflected wave R provided from the antenna element 44.

In general, processing an electric signal with a higher frequency makes a configuration of a member that processes the signal more complicated, which thus reduces the cost performance, or the like. With the frequency converter, the frequency of the transmission signal processed by the transmitter 3, the signal distributor 42, the phase shifter 43, and/or the amplifier or the like may be made lower than the frequency of the transmitting wave T. Further, with the frequency converter, the frequency of the reflected wave R processed by the amplifier, the phase shifter 43, the signal distributor 42, and/or the converter 45 or the like may be made lower than the frequency of the reflected wave R. Therefore, the configuration of these components may be made simpler and the cost performance or the like of the radar device 1 may be improved.

The number of the frequency converters is preferably $n_P$ or more. Because the number of the frequency converters is $n_P$ or more, the frequency of each of transmission signals distributed by the signal distributor 42 may be converted. As such, the transmitter 3 and the signal distributor 42 may be configured to process a frequency lower than the frequency of the transmitting wave T. Further, because the number of the frequency converters is $n_P$ or more, the phase shifter 43 and/or the amplifier may be configured to process a frequency lower than the frequency of the transmitting wave T. Because the number of the frequency converters is $n_P$ or more, each of reflected waves R received by the $n_P$ antenna elements 44 may be converted. As such, the signal distributor 42 and the converter 45 may be configured to process a frequency lower than the frequency of the reflected wave R. Further, the amplifier and/or the phase shifter 43 may be configured to process a frequency lower than the frequency of the reflected wave R.

The frequency converter is not specifically limited, and may be a frequency converter of the prior art. The frequency converter may be, for example, a mixer that synthesizes a predetermined periodic signal $LO_P$ (this signal is a signal usually referred to as LO, but is denoted as the predetermined periodic signal $LO_P$ to discriminate it from a specific periodic signal in the second embodiment, to be described below) with the transmitting wave T and/or the reflected wave R, thereby converting the frequency of the transmitting wave T and/or the reflected wave R. By synthesizing the predetermined periodic signal $LO_P$ and the transmission signal, it is possible to convert the frequency of the transmission signal into a frequency of a sum of the frequency of the predetermined periodic signal $LO_P$ and the frequency of the transmission signal. By synthesizing the predetermined periodic signal $LO_P$ and the reflected wave R, it is possible to convert the frequency of the reflected wave R into a frequency of a difference between the frequency of the predetermined periodic signal $LO_P$ and the frequency of the reflected wave R.

[Support Structure 5]

The support structure 5 is able to support the one or more linear array antennae 4. The support structure 5 is not specifically limited, and may be a support structure of the prior art. The support structure 5 is preferably able to support the one or more linear array antennae 4 so as to maintain a positional relationship of each of the one or more linear array antennae 4 in a predetermined positional relationship. This may make it easier to perform the location estimation process to be described below.

[Flowchart]

Figure 3:
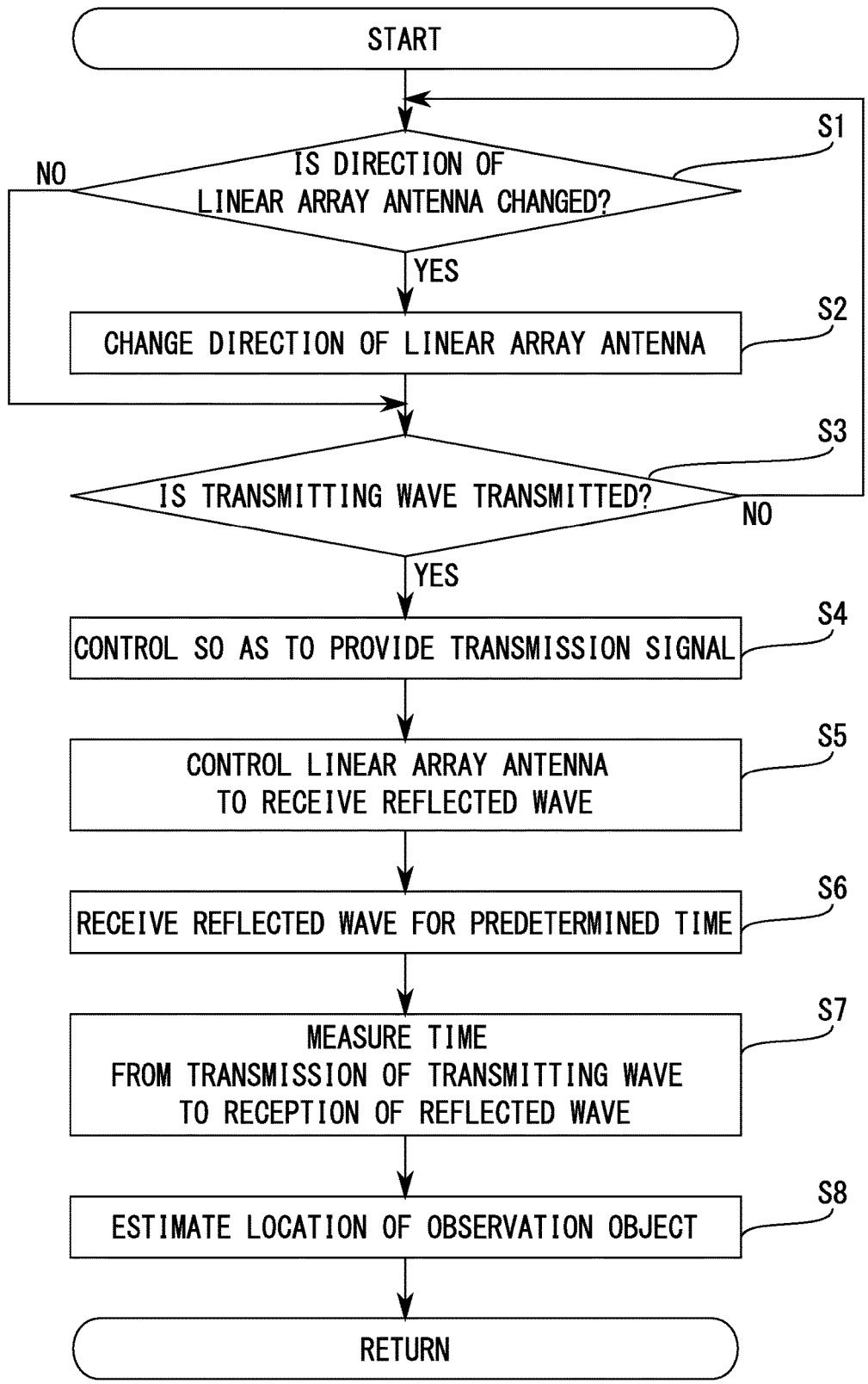
FIG. 3 is a flowchart illustrating an example of a flow of a location estimation process to be performed by a controller 2.

FIG. 3 is a flowchart illustrating an example of a flow of the location estimation process to be performed by the controller 2. Hereinafter, with reference to FIG. 3, description is given of an example of a preferred procedure of the location estimation process performed by the controller 2.

[Step S1: Determine Whether or not to Change the Direction of the Linear Array Antenna]

The controller 2 determines whether or not to change the direction of the linear array antenna 4 (step S1). If the direction of the linear array antenna 4 is changed, the controller 2 shifts the processing to step S2. If the direction of the linear array antenna 4 is not changed, the controller 2 shifts the processing to step S3. By determining whether or not to change the direction of the linear array antenna 4, it is possible to perform a process of changing the direction of the linear array antenna 4 if it is determined that the direction of the linear array antenna 4 is changed.

The method of determining whether or not to change the direction of the linear array antenna 4 is not specifically limited. The method of determining whether or not to change the direction of the linear array antenna 4 preferably includes a method of determining that the direction of the linear array antenna 4 is changed, for example, if a direction from the linear array antenna 4 toward the observed object differs from the direction of the linear array antenna 4. As such, if the direction from the linear array antenna 4 toward the observed object differs from the direction of the linear array antenna 4, it is possible to control the direction of the linear array antenna 4 to be the direction from the linear array antenna 4 toward the observed object.

The method of determining whether or not to change the direction of the linear array antenna 4 preferably includes a method of determining that the direction of the linear array antenna 4 is changed, for example, in response to a user who uses the radar device 1 issuing the instruction to change the direction of orientation. This makes it possible to change the direction of the linear array antenna 4 in response to the instruction from the user who uses the radar device 1.

[Step S2: Change the Direction of the Linear Array Antenna]

The controller controls the phase of each of the transmitting wave T and the reflected wave R via the plurality of phase shifters 43, and changes the direction of each of the one or more linear array antennae 4 (Step S2). The controller 2 shifts the processing to step S3.

The process of controlling the phase of each of the transmitting wave T and the reflected wave R via the plurality of phase shifters 43, and changing the direction of the linear array antennae 4 is not specifically limited. The process of changing the direction of the linear array antennae 4 preferably includes a process of changing a direction of an array antenna in a phased-array antenna of the prior art. If each of the plurality of antenna elements 44 is disposed with the predetermined arrangement gap $s_P[m]$, the process of changing the direction of the linear array antennae 4 may be, for example, a process of giving the predetermined phase αP to each of the phase of the transmitting wave T transmitted by and the phase of the reflected wave R received by the two adjacent antenna elements 44. With this, the direction of the linear array antenna 4 to a direction towards the conical surface area may be controlled, the central axis of the conical surface area being the longitudinal direction of the linear array antenna 4.

Subsequently, description is given of the direction of the antenna when the transmitting wave T is transmitted. The radar device may further increase the gain in the reflected wave R and further lengthen a detection available distance by orienting the antenna for transmission and the receiving antenna to the same direction. As such, the radar device may estimate a location of the observed object in an even wider area.

The one or more linear array antennae 4 which transmit the transmitting wave T, and the one or more linear array antennae that are the same and/or different from the linear array antennae 4 which transmit the transmitting wave T and that receive the reflected wave T are both linear array antennae. Therefore, the process performed in step S2 may make the direction of the linear array antennae when transmitting the transmitting wave T and the direction of the linear array antenna when receiving the reflected wave R the same conical surface direction. This may increase the gain related to the reflected wave R and make the detection available distance an even longer distance. Therefore, the location of the observed object in the wide area may be estimated.

The process of changing the direction of the linear array antennae 4 preferably includes a process of controlling the phases of the transmitting wave T and the reflected wave R to control the direction of the linear array antenna 4 to be a direction from the linear array antenna toward the observed object. To control the direction of the linear array antenna 4 to the direction from the linear array antenna 4 toward the observed object is to orient the linear array antenna 4 in a conical surface shape and make the observed object included in the side surface of the conical surface and/or in the vicinity of the side surface of the conical surface.

As such, the direction of the linear array antenna 4 is controlled to be the direction from the linear array antenna 4 to the observed object, which may further increase the gain of the transmitting wave T illuminating the observed object. Further, the gain of the reflected wave R may be further increased. Since both the gain of the transmitting wave T illuminating the observed object and the gain of the reflected wave R may be increased, the detection available distance of the radar device 1 may be made even longer. Therefore, the location of the observed object in an even wider area may be estimated.

If the method of determining whether or not to change the direction of the linear array antenna 4 includes the method of determining that the direction of the linear array antenna 4 is changed, in response to the user who uses the radar device 1 issuing the instruction to change the direction of orientation, the process of changing the direction of the linear array antenna 4 preferably includes a process of changing the direction of the linear array antenna 4 to the direction in response to the user's instruction. This makes it possible to change the direction of the linear array antenna 4 in response to the user's instruction.

[Step S3: Determine Whether or not to Transmit the Transmitting Wave]

The controller 2 determines whether or not to transmit the transmitting wave T (step S3). If the transmitting wave T is transmitted, the controller 2 shifts processing to step S4. If the transmitting wave T is not transmitted, the controller 2 shifts the processing to step S1 and repeats the processing of steps S1 to S8. By determining whether or not to transmit the transmitting wave T, it is possible to transmit the transmitting wave T only when it is determined that the transmitting wave T is to be transmitted. The process of determining whether or not to transmit the transmitting wave T is not specifically limited.

If the transmitter 3 provides the linear array antenna 4 with the pulse wave transmission signal that causes transmission of the transmitting wave T which is the pulse wave, the process of determining whether or not to transmit the transmitting wave T preferably includes a process of determining that the transmitting wave T is to be transmitted when the pulse wave is transmitted and determining that the transmitting wave T is not to be transmitted when the pulse wave is not transmitted. This makes it possible to transmit the pulse wave that is transmitted intermittently.

If the transmitter 3 provides the linear array antenna 4 with the chirp wave transmission signal that causes transmission of the transmitting wave T which is the chirp wave, the process of determining whether or not to transmit the transmitting wave T preferably includes a process of determining that the transmitting wave T is to be transmitted when the chirp wave is transmitted and determining that the transmitting wave T is not to be transmitted when the chirp wave is not transmitted. This makes it possible to transmit the chirp wave that is transmitted intermittently in accordance with the chirp signal transmission signal.

The process of determining whether or not to transmit the transmitting wave T preferably includes a process of determining that the transmitting wave T is to be transmitted between the time when the user who uses the radar device 1 instructs start of the transmission of the transmitting wave T and the time when the user instructs stop of the transmission of the transmitting wave T, and a process of determining that the transmitting wave T is not to be transmitted between the time when the user who uses the radar device 1 instructs the stop of the transmission of the transmitting wave T and when the user instructs the start of the transmission of the transmitting wave T. This makes it possible to transmit the transmitting wave T in response to the instruction of the user who uses the radar device 1.

[Step S4: Control so as to Provide the Transmission Signal]

The controller 2 controls the transmitter 3 so as to provide the linear array antenna 4 with the transmission signal that causes the transmitting wave T to be transmitted (step S4). The controller 2 shifts the processing to step S5. By controlling the transmitter 3 so as to provide the linear array 4 with the transmission signal that causes the transmitting wave T to be transmitted, it is possible to transmit the transmitting wave T via the linear array antenna 4.

Figure 4:
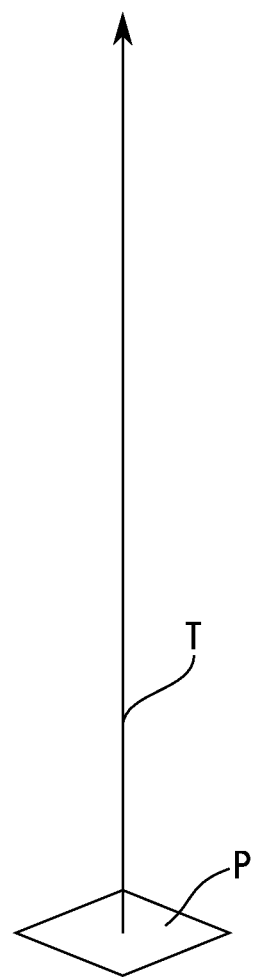
FIG. 4 is a conceptual diagram illustrating a transmitting wave T to be transmitted from an antenna for transmission P of the prior art.
Figure 5:
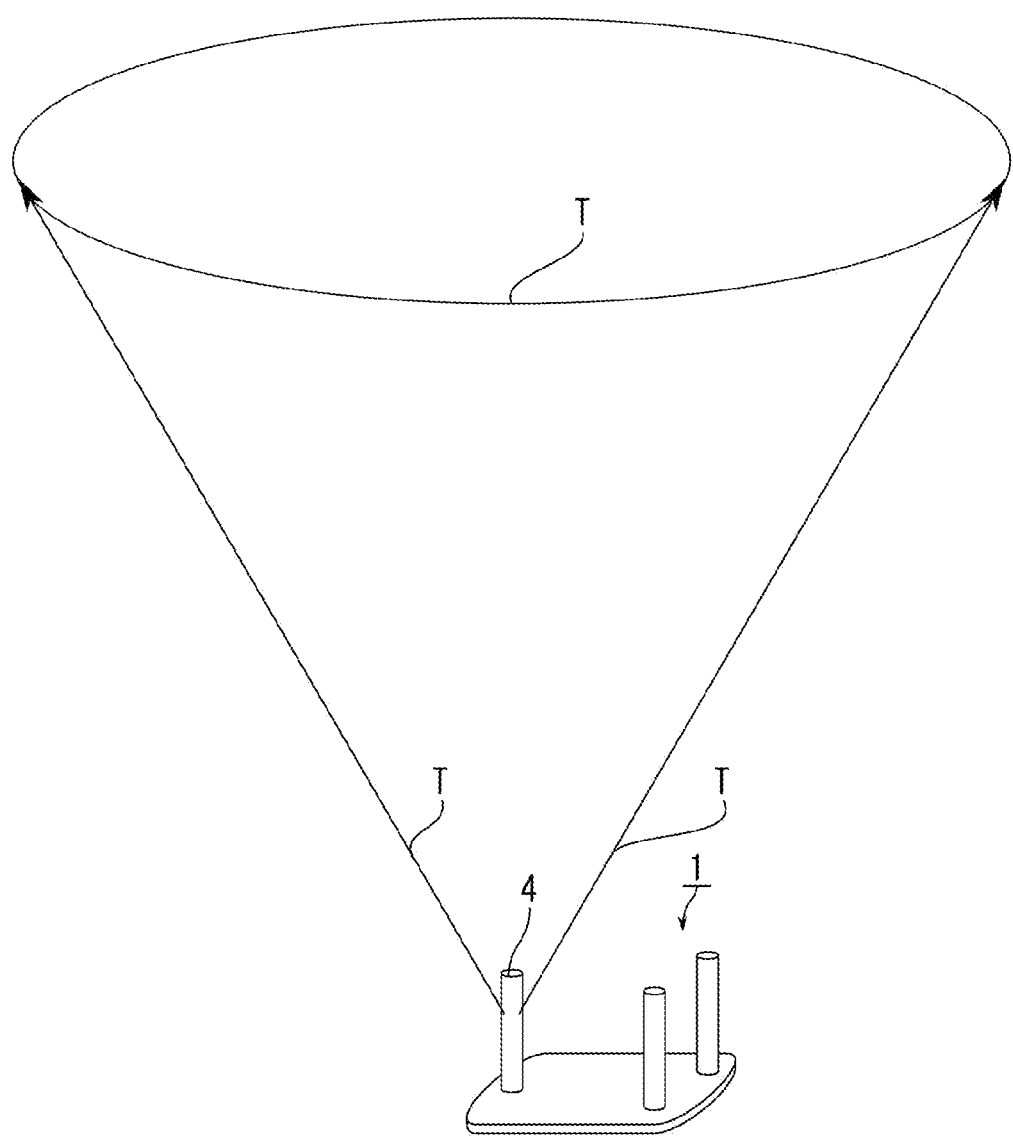
FIG. 5 is a conceptual diagram illustrating a transmitting wave T that is transmitted from a linear array antenna 4 and oriented in a conical surface shape.

Description is given of a difference between a linearly transmitted transmitting wave T of the prior art and a conically oriented transmitting wave T of the present embodiment. FIG. 4 is a conceptual diagram illustrating the transmitting wave T transmitted from an antenna for transmission P of the prior art. FIG. 5 is a conceptual diagram illustrating the transmitting wave T that is transmitted from the linear array antenna 4 and oriented in the conical surface shape. The transmitting wave T transmitted from the prior-art antenna for transmission P is transmitted to the linear range (FIG. 4). However, the transmitting wave T transmitted from the linear array antenna 4 of the present embodiment is transmitted to the conical surface area (FIG. 5). The term conical surface area as used herein is an area along the side surface of the cone and does not include the inside of the cone.

Since the transmitting wave T transmitted from the linear array antenna 4 of the present embodiment is transmitted to the conical surface area, it is transmitted to a wider area than the transmitting wave T transmitted to the linear range. Since the transmitting wave T transmitted from the linear array antenna 4 of the present embodiment is transmitted to the conical surface area, it is transmitted to a narrower area than a transmitting wave transmitted to an area (also referred to as a fan-shaped range) that includes the side surface of the cone and the inside of the cone. This makes it possible to make the intensity of the transmitting wave T illuminating the observed object higher than that of the transmitting wave transmitted to the fan-shaped range.

The transmission signal is not specifically limited. The transmission signal includes, for example, the pulse wave transmission signal that causes the linear array antenna 4 to transmit the transmitting wave T which is the pulse wave, the chirp transmission signal that causes the linear array antenna 4 to transmit the transmitting wave T which is the chirp wave, and/or the frequency modulated continuous wave transmission signal that causes the linear array antenna 4 to transmit the transmitting wave T which is the frequency modulated continuous wave.

In order to measure the time from the transmission of the transmitting wave T to the reception of the reflected wave R, it is necessary to identify the transmitting wave T that generates the reflected wave R. However, if the transmitting wave T that is not frequency modulated is transmitted continuously, it is difficult to identify the transmitting wave that generates the reflected wave R. Therefore, if the transmitting wave T that is not frequency modulated is transmitted continuously, measurement of the time from the transmission of the transmitting wave T to the reception of the reflected wave R may become difficult.

Because the transmission signal includes the pulse transmission signal, the linear array antenna 4 is able to transmit the transmitting wave T including the pulse wave. As such, the transmitting wave T that generates the reflected wave R may be identified and the transmitting wave including the pulse wave may be associated with the reflected wave R. Therefore, it is possible to measure the time from the transmission of the transmitting wave T including the pulse wave to the reception of the reflected wave R more accurately than a case where the continuous wave that is not subjected to the frequency modulation is transmitted.

Because the transmission signal includes the chirp transmission signal, the linear array antenna 4 is able to transmit the chirp wave. This makes it possible to measure the time from the transmission of the transmitting wave T including the chirp wave to the reception of the reflected wave R, by using the frequency of the reflected wave R, even when the transmitting wave T including the chirp wave is transmitted longer than the pulse wave.

Because the transmission signal includes the pulse wave transmission signal and/or the chirp wave transmission signal, the transmitting wave T is transmitted intermittently. Therefore, the reflected wave R may be easily associated with the transmitting wave T that generates the reflected wave R. This makes it possible to easily measure the time from the transmission of the transmitting wave T to the reception of the reflected wave R.

In addition, as such, the reflected wave R may be received by the linear array antenna 4 while the linear array antenna 4 is not transmitting the transmitting wave T. Therefore, it is possible to receive the reflected wave R without having another antenna for transmitting the reflected wave R. As such, the radar device 1 may be configured to have a simpler structure than a radar device having another antenna for receiving the reflected wave R. Therefore, the cost performance and/or maintainability or the like of the radar device 1 may be improved.

Because the transmission signal includes the frequency modulated continuous wave transmission signal, the linear array antenna 4 is able to transmit the frequency modulated continuous wave. As such, the time from the transmission of the transmitting wave T to the reception of the reflected wave R may be measured by using a comparison of the frequency of the transmitting wave T and the frequency of the reflected wave R. Therefore, even when the transmitting wave T is not the transmitting wave T that is transmitted intermittently, the time from the transmission of the transmitting wave T to the reception of the reflected wave R may be measured. Moreover, because the transmission signal includes the frequency modulated continuous wave transmission signal, more transmitting waves may illuminate the observed object and more reflected wave may be generated.

If the transmission signal includes the frequency modulated continuous wave transmission signal, and the linear array antenna 4 for transmitting the transmitting wave T and the linear array antenna 4 for receiving the reflected wave R differ from each other, it is preferable that the controller 2 control the linear array antenna 4 that is different from the linear array antenna 4 for transmitting the transmitting wave T so that that linear array antenna 4 receives the reflected wave R. This makes it possible to transmit the transmitting wave even while receiving the reflected wave.

Turn back to FIG. 3. If the transmission signal includes the pulse wave transmission signal and/or the chirp wave transmission signal, the controller 2 preferably performs the process of controlling the linear array antenna 4 so as to receive the reflected wave R illustrated in step S5.

[Step S5: Control the Linear Array Antenna so as to Receive the Reflected Wave]

The controller 2 controls the linear array antenna 4 so as to receive the reflected wave R (step S5). The controller 2 shifts the processing to step S6. This allows the reflected wave R to be received. The process of controlling the linear array antenna 4 so as to receive the reflected wave R is not specifically limited.

It is preferable that the process of controlling the linear array antenna 4 so as to receive the reflected wave R include the process of controlling the linear array antenna 4 so as to receive the reflected wave R, that linear array antenna 4 being the same as the linear array antenna that transmits the transmitting wave T in step S4. This allows the reflected wave R to be received at a location of the linear array antenna 4 that transmits the transmitting wave T. As such, the direction of the transmitting wave T and the direction of the reflected wave R match better than a case where the reflected wave R is received at a location different from that of the linear array antenna 4 that transmits the transmitting wave T. Therefore, the gain related to the reflected wave R may be increased without changing the direction of the linear array antenna 4 between when the transmitting wave T is transmitted and when the reflected wave R is received. As such, the detection available distance of the radar device 1 may be made even longer. Hence, the location of the observed object in the wide area may be estimated.

In addition, because the process of controlling the linear array antenna 4 so as to receive the reflected wave R includes the process of controlling the linear array antenna 4 to transmit the reflected wave R, that linear array antenna 4 being the same as the linear array antenna that transmits the transmitting wave T in step S4, it is possible to transmit the transmitting wave T without having another antenna for transmitting the transmitting wave T. As such, the radar device 1 may be configured to have the simpler structure that a radar device having the other antenna for transmitting the transmitting wave T. Therefore, the cost performance and/or maintainability or the like of the radar device 1 may be improved.

If the number of the linear array antennae 4 is two or more, it is preferable that the process of controlling the linear array antenna 4 so as to receive the reflected wave R include a process of controlling the linear array antenna 4 so as to receive the reflected wave R, that linear array antenna 4 being different from the linear array antenna 4 that transmits the transmitting wave T in step S4. This allows the reflected wave R to be received at the linear array antenna 4 which is different from the linear array antenna 4 that transmits the transmitting wave T, even when the frequency modulated transmitting wave T is transmitted continuously. As such, more transmitting waves T may illuminate the observed object and more reflected waves R may be generated.

If the number of the linear array antennae 4 is two or more, it is preferable that the process of controlling the linear array antenna 4 so as to receive the reflected wave R include a process of controlling the two or more linear array antennae 4 so as to receive the reflected wave R. This makes it possible to perform a process of specifying two locations including the location of the observed object. The process of specifying the two locations including the location of the observed object is described below in more detail with reference to FIG. 8.

If the number of the linear array antennae 4 is three or more, and at least the three or more linear array antennae 4 are disposed non-linearly, it is preferable that the process of controlling the linear array antenna 4 so as to receive the reflected wave include a process of controlling the three or more non-linearly disposed linear array antennae 4 so as to receive the reflected wave R. This makes it possible to perform the process of specifying the location of the observed object. The process of specifying the location of the observed object is described below in more detail with reference to FIG. 9.

[Step S6: Receive the Reflected Wave for a Predetermined Time]

The controller 2 controls the one or more linear array antennae 4 so as to receive the reflected wave R for a predetermined time (step S6). By controlling the controller 2 so as to receive the reflected wave 2 for the predetermined time, it is possible to measure the time from the transmission of the transmitting wave until the linear array antenna 4 receives the reflected wave, by using the received reflected wave, and to perform the processing of estimating the location of the observed object. The predetermined time is not specifically limited, and may be, for example, time according to a transmission cycle of the pulse wave and/or the chirp wave or time according to a cycle in which the frequency modulated continuous wave repeats modulation, or the like.

[Step S7: Measure the Time from the Transmission of the Transmitting Wave to the Reception of the Reflected Wave]

For each of the one or more observed objects where reflected waves are generated, the controller 2 measures the time from the transmission of the transmitting wave to the reception of the reflected wave by each of the one or more linear array antennae 4 (step S7). The controller 2 shifts the processing to step S8. As such, the time from the transmission of the transmitting wave to the reception of the reflected wave, which is used in the process of estimating the location of the observed object, is obtained.

The process of measuring the time from the transmission of the transmitting wave to the reception of the reflected wave by each of the one or more linear array antennae 4 (hereinafter, also simply referred to as a "reflected wave reception time measurement process") is not specifically limited.

If the transmitting wave T includes the pulse wave, it is preferable that the reflected wave reception time measurement process include a process of measuring the time from when the pulse wave is transmitted until each of the one or more linear array antennae 4 receives the reflected wave R. This makes it possible to associate the pulse wave with the reflected wave R and more accurately measure the time until the reflected wave R is received than a case where the continuous wave that is not subjected to frequency modulation is transmitted.

If the transmitting wave T includes the chirp wave, it is preferable that the reflected wave reception time measurement process include a process of measuring the time from when the chirp wave is transmitted until each of the one or more linear array antennae 4 receives the reflected wave R, using the phase difference and/or the frequency difference between the chirp wave and the reflected wave R. Use of the phase difference and/or the frequency difference between the chirp wave and the reflected wave R makes it possible to measure the time until the reflected wave R is received, even for the chirp wave that is transmitted for a longer time than the pulse wave. Therefore, more transmitting waves T may illuminate the observed object. Further, more reflected waves R may be generated. As such, more reflected waves R may be received than a case where the transmitting wave T is the pulse wave. Therefore, the location of the observed object may be estimated more reliably.

If the transmitting wave T includes the frequency modulated continuous wave, the reflected wave reception time measurement process preferably includes a process of removing the transmitting wave T from the reflected wave R. If the transmitting wave T is transmitted continuously, the linear array antenna 4 may also receive the transmitting wave T when receiving the reflected wave R. The received transmitting wave T may become noise in processing using the reflected wave R. Because the reflected wave reception time measurement process includes the process of removing the transmitting wave T from the reflected wave R, the transmitting wave T may be removed from the reflected wave R, preventing the received transmitting wave T from becoming noise. The process of removing the transmitting wave T from the reflected wave R is not specifically limited, and may be a prior-art process of removing the transmitting wave T from the reflected waves R.

Figure 6:
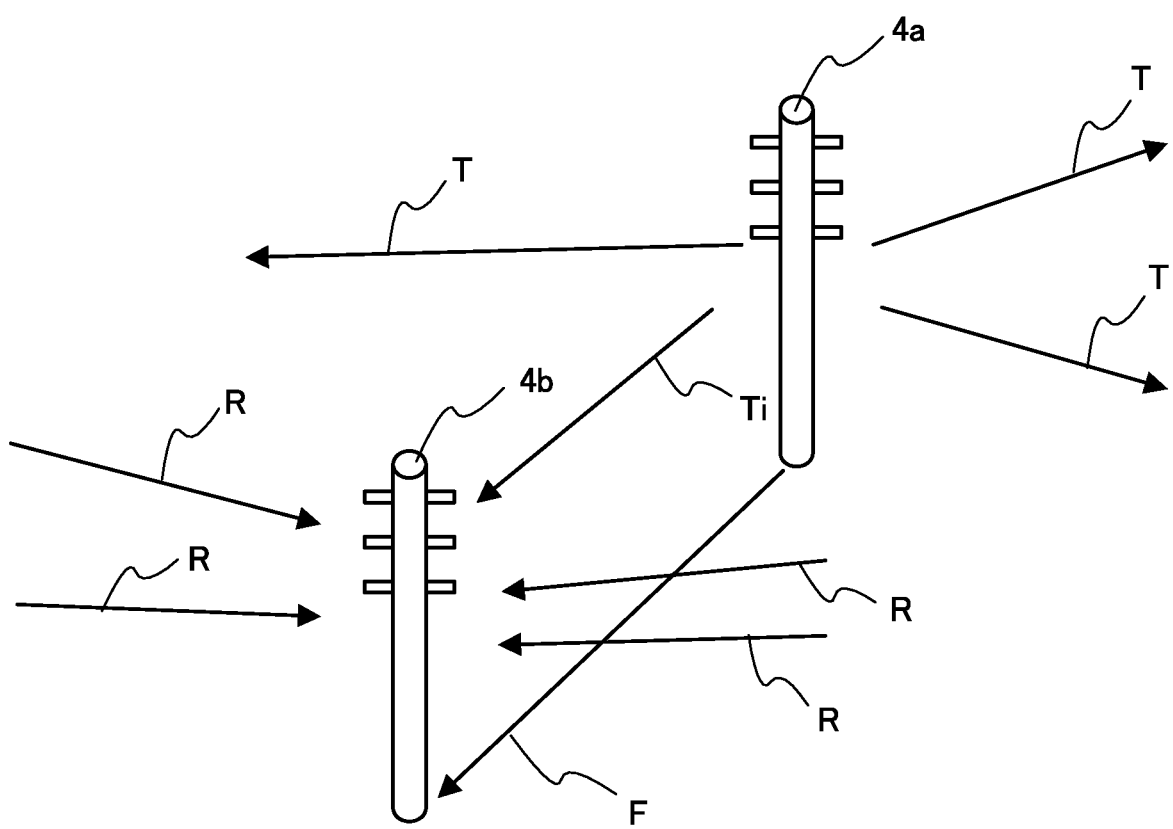
FIG. 6 is a conceptual diagram illustrating that a feedback signal F is used to reduce interference Ti of the transmitting wave.

FIG. 6 is a conceptual diagram illustrating that a feedback signal F is used to reduce a transmitting wave Ti that interferes with a reflected wave. The process of removing the transmitting wave T from the reflected wave R may be, for example, a process of removing the transmitting wave Ti that interferes with the reflected wave R, by adding the feedback signal F to the reflected wave R, the feedback signal F being generated by using the transmitting wave T whose phase is inverted, as illustrated in FIG. 6.

If the transmitting wave T includes the frequency modulated continuous wave, it is preferable that the reflected wave reception time measurement process include the process of measuring the time from when the transmitting wave T is transmitted until each of the one or more linear array antennae 4 receives the reflected wave R, by using the comparison of the frequency of the transmitting wave T and the frequency of the reflected wave R. This makes it possible to measure the time until the reflected wave R is received even for the frequency modulated continuous wave that is transmitted continuously. Therefore, more transmitting waves T may illuminate the observed object. As such, then, more reflected waves R may be generated. More reflected waves may be received than a case where the transmitting wave T is the pulse wave and/or the chirp wave that is transmitted intermittently. As such, the location of the observed object may be estimated more reliably.

The generation of more reflected waves R in the observed object and the measurement of the time from the transmission of the transmitting wave T to the reflected wave R may be achieved simultaneously by including the process of the reflected wave reception time measurement process removing the transmitting wave T from the reflected wave R when the transmitting wave T includes the frequency modulated continuous wave and the process of measuring the time from when the transmitting wave T is transmitted until each of the one or more linear array antennae 4 receives the reflected wave R by using the comparison of the frequency of the transmitting wave T and the frequency of the reflected wave R. As such, more reflected waves R may be received and the location of the observed object may be estimated even more reliably.

[Step S8: Estimate the Location of the Observed Object for Each Observed Object]

Turn back to FIG. 3. For each of the one or more observed objects where the reflected wave R is generated, the controller 2 estimates the location of the observed object by using the time from the transmission of the transmitting wave T until each of the one or more linear array antennae 4 receives the reflected wave R (step S8). The controller 2 shifts the process to step S1 and repeats the processing of steps S1 to S8. This allows the location of the observed object to be estimated for each of the one or more observed objects where the reflected wave R is generated. The process of estimating the location of the observed object is not specifically limited.

The process of estimating the location of the observed object preferably includes a process of specifying an approximately circular space including the location of the observed object.

The direction from the linear array antenna 4 to the location of the observed object where the reflected wave R is generated is the same direction as the direction of the transmitting wave T. In the processing of step S4, the transmitting wave T is transmitted by using the linear array antenna 4 oriented to the direction of the conical surface. Therefore, the location of the observed object is included in this conical surface and the periphery thereof. The time from the transmission of the transmitting wave T to the reception of the reflected wave R varies depending on the distance from the linear array antenna 4 to the observed object. Therefore, the distance from the linear array antenna 4 to the observed object may be measured by using the time from the transmission of the transmitting wave T to the reception of the reflected wave R.

A location of the apex of the conical surface is the same as that of the linear array antenna 4. Therefore, a space that is included in the conical surface and the periphery thereof and where the distance from the linear array antenna 4 satisfies the measured distance is an approximately circular space. Consequently, use of the time from the transmission of the transmitting wave T to the reception of the reflected wave R and the direction of the transmitting wave T makes it possible to specify the approximately circular space including the observed object.

If the number of the linear array antennae 4 is two or more, and the process of controlling the linear array antenna 4 so as to receive the reflected wave R in step S5 includes the process of controlling the two or more linear array antennae 4 so as to receive the reflected wave R, the process of estimating the location of the observed object preferably includes the process of specifying the two locations including the location of the observed object.

Since the process of controlling the linear array antenna 4 so as to receive the reflected wave R in step S5 includes the process of controlling the two or more linear array antennae 4 so as to receive the reflected wave R, it is possible to specify two or more approximately circular spaces using the respective reflected waves R received by the two or more linear array antennae 4. Use of these two or more approximately circular spaces makes it possible to specify two intersecting points. Therefore, it is possible to configure so that the processing of estimating the observed object includes the process of specifying the two locations.

If the number of the linear array antennae 4 is three or more, and the process of controlling the linear array antenna 4 so as to receive the reflected wave R in step S5 includes the process of controlling the three or more linear array antennae 4 so as to receive the reflected wave R, the process of estimating the location of the observed object preferably includes the process of specifying the location of the observed object.

Since the process of controlling the linear array antenna 4 so as to receive the reflected wave in step S5 includes the process of controlling that the three or more linear array antennae 4 receive the reflected wave R, it is possible to specify three or more approximately circular spaces by using the respective reflected waves R received by the three or more linear array antennae. Then, use of an intersecting point of these three or more approximately circular spaces makes it possible to specify the location of the observed object.

<Usage Examples>

Figure 7:
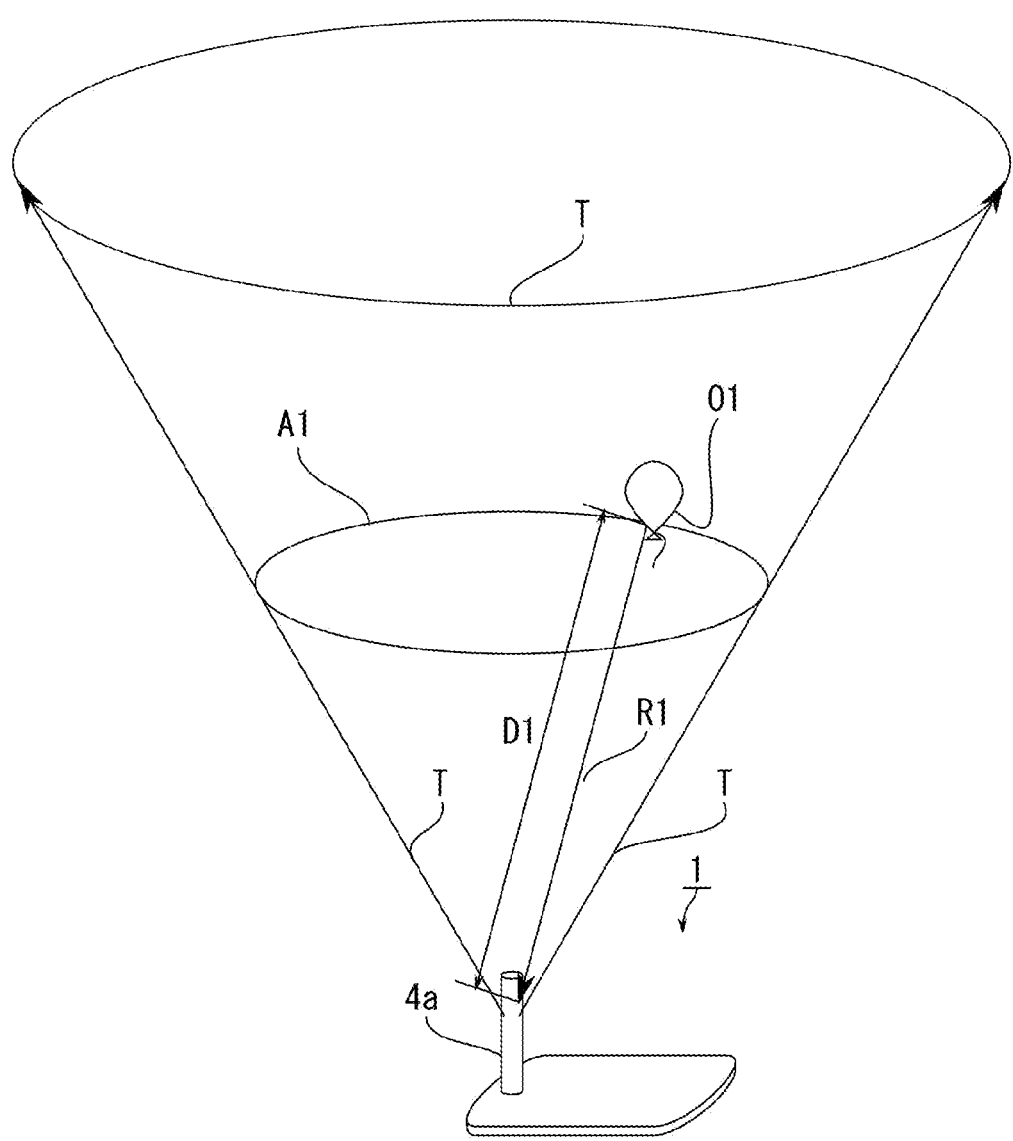
FIG. 7 is a conceptual diagram illustrating a process of estimating a location of an observed object O1, by using a direction of the transmitting wave T and time until a first linear array antenna 4a receives a first reflected wave R1.
Figure 8:
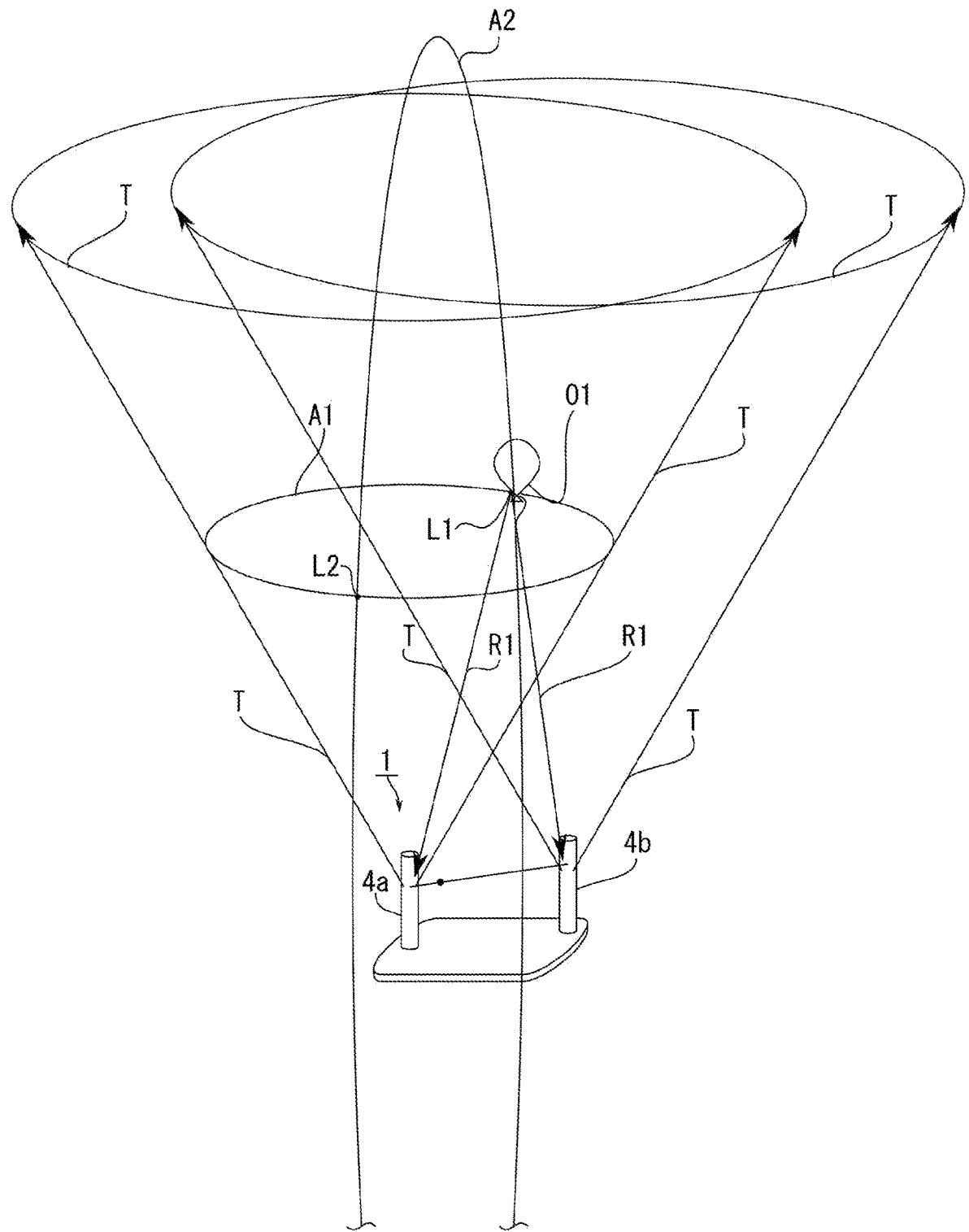
FIG. 8 is a conceptual diagram illustrating a process of specifying two locations including the location of the observed object O1, by using the direction of the transmitting wave T, until each of the first linear array antenna 4a and a second linear array antenna 4b receives the first reflected wave R1, and detection of an arrival angle.
Figure 9:
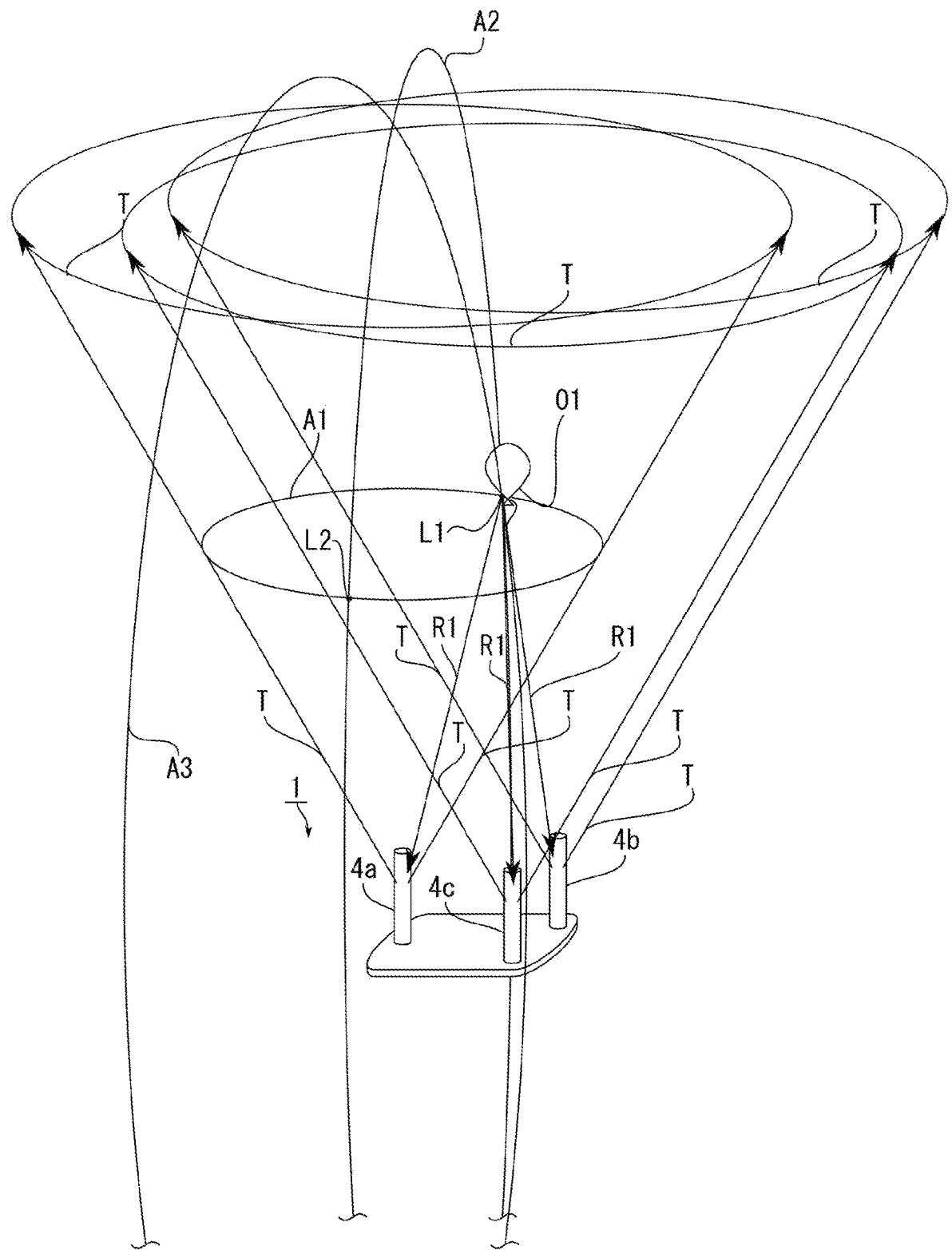
FIG. 9 is a conceptual diagram illustrating a process of specifying a location of the observed object O1, by using the direction of the transmitting wave T, time until each of the first linear array antenna 4a, the second linear array antenna 4b, and a third linear array antenna 4c receives the first reflected wave R1, and the detection of the arrival angle.

FIG. 7 is a conceptual diagram illustrating a process of estimating a location of an observed object O1, using the direction of the transmitting wave T and the time until the first linear array antenna 4a receives a first reflected wave R1. FIG. 8 is a conceptual diagram illustrating the process of specifying the two locations including the location of the observed object O1, by using the direction of the transmitting wave T, time until each of the first linear array antenna 4a and the second linear array antenna 4b receives the first reflected wave R1, and the detection of the arrival angle. FIG. 9 is a conceptual diagram illustrating the process of specifying the location of the observed object O1 using the direction of the transmitting wave T, time until each of the first linear array antenna 4a, the second linear array antenna 4b, and the third linear array antenna 4c receives the first reflected wave R1, and the detection of the arrival angle. Hereinafter, description is given of usage examples of the radar device 1 in the present embodiment with reference to FIG. 7 to FIG. 9, where appropriate.

[Changing the Direction of the Transmitting Wave]

The user who uses the radar device 1 instructs the controller 2 to change the direction of the linear array antenna 4 to the direction from the linear array antenna 4 toward the observed object. The controller 2 controls the first linear array antenna 4a, the second linear array antenna 4b, and the third linear array antenna 4c, controlling the directions of these linear array antennae 4 so as to be the direction from these linear arran antennae 4 toward the observed object.

[Transmitting the Transmitting Wave]

The user who uses the radar device 1 instructs the controller 2 to transmit the transmitting wave T. The controller 2 controls the transmitter 3 so as to provide the linear array antenna 4 with a transmission signal that causes the transmitting wave T to be transmitted. The transmitter 3 provides the linear array antenna 4 with the transmission signal. Then, the transmitting wave T is transmitted from the linear array antenna 4.

[Receiving the Reflected Wave]

The controller 2 controls each of the first linear array antenna 4a, the second linear array antenna 4b, and the third linear array antenna 4c so as to receive the first reflected wave R1 that is generated when the transmitting wave T illuminates the first observed object O1. Each of the first linear array antenna 4a, the second linear array antenna 4b, and the third linear array antenna 4c receives the first reflected wave R1.

[Measuring the Time Until the Reflected Wave is Received]

The controller 2 measures the time from when the transmitting wave T is transmitted until each of the first linear array antenna 4a, the second linear array antenna 4b, and the third linear array antenna 4c receives the first reflected wave R1.

[Estimating the Location of the Observed Object]

The controller 2 estimates the location of the first observed object O1 by using the time until the measured first reflected wave R1 is received.

[Process of Specifying the Approximately Circular Space]

With reference to FIG. 7, description is given of a process of specifying the approximately circular space including the first observed object O1 in a case where the radar device 1 includes only the first linear array antenna 4a.

The transmitting wave T transmitted to the conical direction of the linear array antenna 4a illuminates the first observed object O1, and then generates the first reflected wave R1. The first reflected wave R1 is received by the linear array antenna 4a in the same direction of that of the transmitting wave T. This makes it possible to estimate that the location of the first observed object O1 is included in the conical surface area to which the linear array antenna 4a is oriented.

The measured time until the first reflected wave R1 is received is defined in accordance with a first distance D1 from the linear array antenna 4a to the first observed object O1. Therefore, use of the measured time until the first reflected wave R1 is received allows the first distance D1 from the first linear arran antenna 4a to the first observed object O1 to be measured.

The space that is included in the conical surface area to which the linear array antenna 4a is oriented and where the distance from the first linear array antenna 4a to the first observed object O1 is the first distance D1 is an approximately circular first space A1 illustrated in FIG. 7. Therefore, it is possible to specify the approximately circular first space A1 including the location of the first observed object O1 by using the time from the transmission of the transmitting wave T to the reception of the first reflected wave R1 and the direction of the transmitting wave T. This makes it possible to estimate that the location of the first observed object O1 is included in the first space A1.

[Process of Specifying the Two Locations]

With reference to FIG. 8, description is given of the process of specifying the two locations including the first observed object O1 in a case where the radar device 1 includes the first linear array antenna 4a and the second linear antenna 4b.

If the radar device 1 includes the first linear antenna 4a and the second linear antenna 4b, it is possible to specify the approximately circular first space A1 including the first observed object O1, by using the first reflected wave R1 received by the first linear array antenna 4a.

In a three-dimensional space, it is known that a location of a point where respective distances from two points at different locations are known is included in a circular region that has a center on a straight line passing through these two points and that is included in a plane perpendicular to the straight line. It is also known that a location of a point where a distance from a predetermined location and a difference between the distance from the predetermined location and a distance from a location different from the predetermined location are known is included in the circular region that has the center on a straight line passing through these two locations and that is included in the plane perpendicular to the straight line.

Therefore, it is possible to specify an approximately circular second space A2 including the first observed object O1, by using information regarding a difference between the time from the transmission of the transmitting wave T until the first linear array antenna 4a receives the first reflected wave R1 and the time from the transmission of the transmitting wave T1 until the second linear array antenna 4b receives the first reflected wave R1 (for example, the phase difference and/or the frequency difference between the first reflected waves R1 respectively received by the first linear array antenna 4a and the second linear array antenna 4b, or the like). Therefore, it is possible to specify the two locations (first location L1 and second location L2) including the first observed object O1 through a process of finding an intersecting point of two circles on a plane. Therefore, it is possible to estimate the two locations (first location L1 and second location L2) where the first observed object O1 may be included. In a case where it is known that the location of the first observed object O1 lies in an approximately semi-spherical range that centers around the radar device 1, such as a case where the radar device 1 is installed on the ground, it is possible to estimate that the location of the first observed object O1 is the first location L1.

If a process of specifying the second space A2 includes the process of specifying the second space A2 by using the phase difference and/or the frequency difference of each of the first reflected waves R1 each received by the first linear array antenna 4a and the second linear array antenna 4b, the process of specifying the second space A2 preferably includes, for example, a calculation related to expression (2) illustrated below. A first observed object direction vector denoted by r accompanied by a circumflex (^, also referred to as a hat symbol) is a unit vector having the same direction as a direction toward the first observed object A1 from a predetermined location (The predetermined location is not specifically limited. Hereinafter, description is given on the assumption that the predetermined location is the location of the first linear array antenna 4a.) exemplified by the location of the first linear array antenna 4a or the like. i is a natural number which is equal to or smaller than the number of the linear array antennae 4. The $i^{th}$ linear array antenna vector $r_i$ is a position vector related to the location of the $i^{th}$ linear array antenna (for example, the second linear array antenna 4b, if i=2) in a case based on the predetermined location. The $i^{th}$ linear array antenna vector $r_i$ has an X-axis direction component $x_i$, a y-axis direction component $y_i$, and a z-axis direction component $z_i$. A first angle θ is an angle made by the x-axis direction and the vector r. A second angle φ is an angle made a vector obtained by projecting the first observed object vector r on an xy plane and the x-axis direction. The first angle θ and the second angle φ are both angles related to the first reflected wave R1 received by the first linear array antenna 4a. An angle related to the direction of the first reflected wave R1 received by the first linear array antenna 4a is also referred to as an arrival angle.

[Mathematical Expression (2)]

It is known the phase difference and/or the frequency difference of each of the reflected waves received by the plurality of linear array antennae 4 is a difference that depends on a direction towards the observed object from the predetermined location that serves as a reference and the location of each of the plurality of linear array antennae 4 based on the predetermined location. For example, the phase difference and/or the frequency difference of the respective first reflected waves R1 respectively received by the first linear array antenna 4a and the second linear array antenna 4b is a difference that depends on the direction from the first linear array antenna 4a toward the first observed object A1 and the location of the second linear array antenna 4b in a case based on the location of the first linear array antenna 4a. Therefore, for example, it is possible to specify a value in the left side of the expression (2) when i=2, based on the location of the first linear array antenna 4a, by using the phase difference and/or the frequency difference of the respective first reflected waves R1 respectively received by the first linear array antenna 4a and the second linear array antenna 4b. It is possible to obtain an expression related to the first angle θ and the second angle φ by specifying the value of the left side of the expression (2).

Therefore, because the process of specifying the second space A2 includes the calculation related to the expression (2), it is possible to obtain the expression related to the first angle θ and the second angle φ. More specifically, it is possible to obtain an expression related to the arrival angle of the first reflected wave R1. The approximately circular second space A2 may be specified by using the time from the transmission of the transmitting wave T until the first linear array antenna 4a received the first reflected wave R1 and the expression related to the first angle θ and the second angle φ. Then, it is possible to estimate the two locations (first location L1 and second location L2) including the first observed object O1 by using the first space A1 and the second space A2.

[Process of Specifying the Location of the Observed Object]

With reference to FIG. 9, description is given of a process of specifying the first observed object O1 in a case where the radar device 1 includes the first linear array antenna 4a, the second linear array antenna 4b, and the third linear array antenna 4c.

As described in the process of specifying the two locations, it is possible to estimate the two locations (first location L1 and second location L2) where the location of the first observed object O1 may be included, by using the time when each of the first linear array antenna 4a and the second linear array antenna 4b receives the first reflected wave R1, or the like. Further, it is possible to specify an approximately circular third space A3 including the first observed object O1, by using a difference between the time from the transmission of the transmitting wave T until the first linear array antenna 4a receives the first reflected wave R1 and the time from the transmission of the transmitting wave T until the third linear array antenna 4c receives the first reflected wave R1.

Therefore, it is possible to specify the location (first location L1) of the first observed object O1 through a process of determining which of the first location L1 and the second location L2 is included in the third space A3.

[Mounting on a Flight Vehicle]

The radar device 1 is usable as a radar device to be mounted on a flight vehicle exemplified by an unmanned aerial vehicle such as a drone, etc., a helicopter, a multicopter, a balloon, an airship, a passenger plane, and a cargo airplane, or the like.

If reflected waves are received from a wide azimuth range using the prior-art radar device that is used by being oriented linearly, a rotation mechanism that rotates the radar device may be necessary. Alternatively, it may be necessary to include a plurality of radar devices for each azimuth direction in which the reflected wave is received. Mounting the rotation mechanism and/or the plurality of radar devices on a flight vehicle may increase weight of the flight vehicle. The increased weight of the flight vehicle may degrade the performance of the flight vehicle that is exemplified by a navigation speed, a cruising distance, payload, stability during flight, or the like.

Since the radar device 1 is able to receive reflected waves from a wide range, the rotation mechanism is not necessary and it is not necessary to include the plurality of radar devices 1. This may prevent an increase in the weight of the flight vehicle and prevent a deterioration in the performance of the flight vehicle.

[Mounting on a Vehicle]

The radar device 1 is usable as a radar device to be mounted on a vehicle exemplified by a passenger car, transport vehicle, and a service vehicle, or the like.

A location of an observed object (for example, an oncoming car, a following car, and a preceding car, or the like) in the periphery of a vehicle is estimated by means of a radar device mounted on the vehicle. By estimating the location of the observed object in the periphery of the vehicle, accidents such as a collision between the vehicle and the observed object, or the like may be prevented.

In the meantime, if the observed object in the periphery of the vehicle is a traveling vehicle, a direction from the radar device toward the observed object may change significantly in a short time. If such a location of the observed object is estimated by using a device that combines the prior-art radar device, which is used by being oriented linearly, with the rotation mechanism, there may be a case where rotations of the radar device by the rotation mechanism are not able to follow a change in the direction.

The radar device 1 may change the direction of the linear array antenna 4 in a short time by controlling the respective phases of the transmitting wave T and the reflected wave R. As such, even if the direction from the radar device toward the observed object changes significantly in a short time, the direction of the linear array antenna 4 may be controlled to be the direction from the linear array antenna 4 toward the observed object. Therefore, even if the observed object is a travelling vehicle in the periphery of the vehicle, the location of the observed object may be estimated.

[Mounting on a Man-Made Satellite]

The radar device 1 is usable as a radar device to be mounted on a man-made satellite exemplified by a communication satellite, meteorological satellite, or an observation satellite, or the like.

If reflected waves are received from a wide azimuth range using the prior-art radar device that is used by being oriented linearly, the rotation mechanism that rotates the radar device may be necessary. Alternatively, it may be necessary to include a plurality of radar devices for each azimuth direction in which the reflected wave is received. If a mechanical rotation mechanism is mounted on the man-made satellite, there may arise a problem that lubricating oil used for rotating parts evaporates due to a vacuum, a problem that reaction accompanying the rotation affects posture control of the man-made satellite, or the like. Moreover, usually, the weight of a man-made satellite to be launched using a rocket is strictly limited. Consequently, if the radar device is mounted on a man-made satellite, improvement of the weight related to the radar device may be called for.

By controlling the respective phases of the transmitting wave T and the reflected wave R, the radar device 1 is able to orient the linear array antenna 4 to an arbitrary direction without using the mechanical rotation mechanism or without including the plurality of radar devices 1. This may solve the problem that the lubricating oil used for the rotating parts evaporates due to the vacuum, the problem that the reaction accompanying the rotation affects the posture control of the man-made satellite, or the like. Further, the weight of the radar device to be mounted on the man-made satellite may be improved.

[Use as a Ground Radar Base]

The radar device 1 is usable as a ground radar base to be installed on the ground. The radar device 1 may change the direction of the linear array antenna 4 in a short time by controlling the respective phases of the transmitting wave T and the reflected wave R. As such, the radar device 1 is usable as the ground radar device for estimating locations of various high-speed flight vehicles.

Second Embodiment

A second embodiment is a radar device whose antenna is an omni-directional antenna.

<Radar Device 101>

Figure 10:
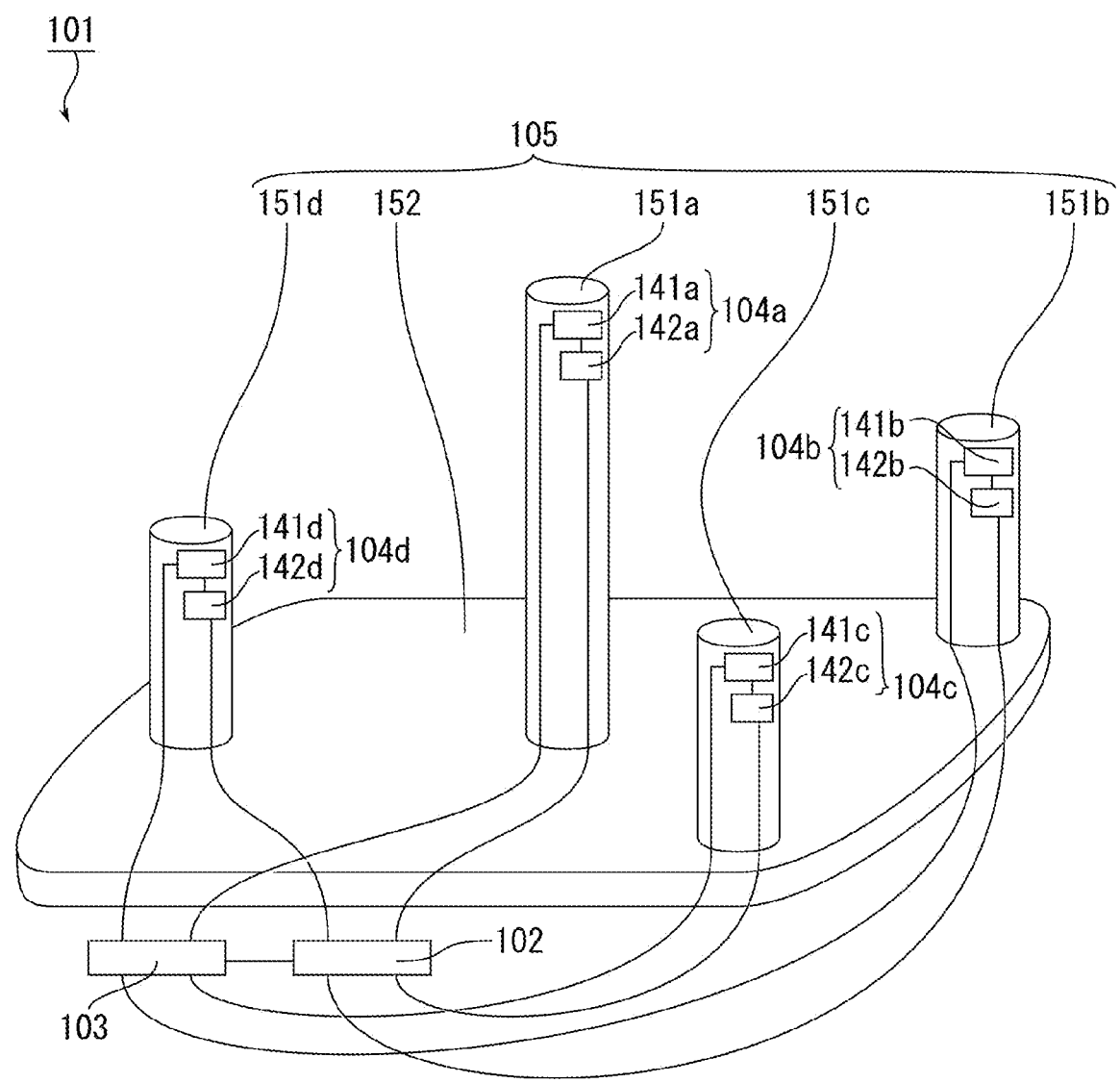
FIG. 10 is a conceptual diagram of a radar device 101 of a second embodiment of the present invention when viewed from diagonally above.

FIG. 10 is a schematic diagram of a radar device 101 in the second embodiment of the present invention when viewed from diagonally above. Hereinafter, with reference to FIG. 10, description is given of an example of a preferred configuration of the radar device 101 in the second embodiment of the present invention.

The radar device 101 includes a controller 102, a transmitter 103, and one or more omni-directional antennae 104 (reference numerals 104a, 104b, 104c, and 14d in FIG. 10).

It is preferable that the radar device 101 further include a support structure 105 capable of supporting the one or more omni-directional antennae 104, although it is not an essential aspect. Inclusion of the support structure 105 allows the one or more omni-directional antennae 104 to be supported by the support structure 105 so that each of these one or more omni-directional antennae 104 maintains a specific positional relationship. This makes it possible to easily perform a process of estimating a location of an observed object, which is described below.

[Controller 102]

The controller 102 controls the transmitter 103 and the one or more omni-directional antennae 104. The controller 102 also performs the location estimation process for estimating the location of the observed object, using the time from the transmission of the transmitting wave to the reception of the reflected wave. Since the radar device 101 includes the controller 102, it is possible to estimate the location of the observed object by performing the location estimation process.

The controller 102 is not specifically limited. The controller 102 may be a prior-art microcomputer including, for example, a CPU (Central Processing Unit), a RAM (Random Access Memory), and a ROM (Read Only Memory), or the like.

The controller 102 is configured to be able to acquire each piece of reflected wave information regarding the reflected waves received by the one or more omni-directional antennae 104. Each piece of reflected wave information includes information that allows for measurement of the time from the transmission of the transmitting wave until the omni-directional antenna 104 receives the reflected wave.

The controller 102 is preferably configured to be able to output the location of the observed object that is estimated by the location estimation process. Means for outputting the location of the observed object is not specifically limited, and may be means for outputting a location of an observed object that is used by the prior-art radar device.

The controller 102 is preferably able to receive various instructions from a user who uses the radar device 102. Examples of various instructions include the instruction to start the transmission of the transmitting waves and/or the instruction to stop the transmission of the transmitting waves, or the like. Because the controller 102 is able to receive various instructions from the user who uses the radar device 101, the radar device 101 may be controlled in response to the user's instruction.

[Transmitter 103]

The transmitter 103 is similar to the transmitter 3 of the first embodiment. The transmitter 103 is able to provide a transmission signal that causes the omni-directional antenna 104 to transmit the transmitting wave. The transmitter 103 is connected to the controller 102 and the omni-directional antenna 104. The transmitter 103 is configured to be able to provide the omni-directional antenna 104 with the transmission signal in accordance with the control by the controller 102. Because the radar device 101 includes the transmitter 103, it is possible to cause the omni-directional antenna 104 to transmit the transmitting wave via the transmission signal.

[Omni-Directional Antenna 104]

The omni-directional antenna 104 is an omni-directional antenna 104 capable of transmitting the transmitting wave in accordance with the transmission signal provided from the transmitter 103 and of receiving a reflected wave that is generated by the transmitting wave illuminating the observed object. Each of the one or more omni-directional antennae 104 is connected to the controller 102 and the transmitter 103. Each of the one or more omni-directional antennae 104 is configured to be controllable by the controller 102. Each of the one or more omni-directional antennae 104 includes an omni-directional antenna element 141 and a converter 142.

Because the radar device 101 includes the one or more omni-directional antennae 104, it is possible to receive the reflected wave from a wider area than the planar phased-array antenna or the like. The omni-directional antenna 104 transmits the transmitting wave to a wider azimuth range than a case where the planar phased-array antenna is used. Then, the transmitting wave illuminates the observed object in a different direction, generating the reflected wave. This reflected wave is received by the omni-directional antenna 104. Therefore, the reflected wave may be received from the wider azimuth range than the case where the planar phased-array antenna is used.

The number of the omni-directional antennae 104 is not specifically limited. The number of the omni-directional antennae 104 is preferably two or more. This makes it possible to perform the process of specifying the approximately circular space including the location of the observed object. The process of specifying the approximately circular space including the observed object is described below with reference to FIG. 15.

The number of the omni-directional antennae 104 is three or more, and it is more preferable that the three omni-directional antennae 104 be disposed non-linearly. This makes it possible to perform the process of specifying the two locations including the location of the observed object. The process of specifying the two locations including the observed object is described below with reference to FIG. 16.

The number of the omni-directional antennae 104 is four or more, and it is further preferable that the four or more omni-directional antennae 104 be disposed so that at least one of the omni-directional antennae 104 is not on the same plane. This makes it possible to perform the process of specifying the observed object. The process of specifying the observed object is described below with reference to FIG. 17.

If a direction from an observed point toward an observed object and a distance from the observed point to the observed object are determined by using a distance from different two observed points, it is known that when the observed object lies on and around a straight line connecting the two observed points, an accuracy of specifying the direction from the observed point toward the observed object degrades. Therefore, if a straight line connecting two omni-directional antenna 104 and a straight line connecting the observed object and the omni-directional antenna 104 are parallel, the accuracy of specifying the direction from the omni-directional antenna 104 toward the observed object may degrade. For example, if the two omni-directional antennae 104 are arranged along a vertical direction, the accuracy of specifying a direction from the omni-directional antenna 104 toward the observed object located above the omni-directional antenna 104 may degrade.

The number of the omni-directional antennae 104 is four or more, and the four or more omni-directional antennas 104 are disposed so that at least the one omni-directional antenna 104 is not on the same plane. As such, a direction of a straight line connecting at least the two omni-directional antennae 104 of the four or more omni-directional antennae 104 differs from the direction from the omni-directional antenna 104 toward the observed object. Therefore, a degradation in the accuracy of specifying the direction from the omni-directional antenna 104 toward the observed object may be prevented.

[Omni-Directional Antenna Element 141]

The omni-directional antenna element 141 (reference numerals 141a, 141b, 141c, and 141d in FIG. 10) is an omni-directional antenna element that transmits the transmitting wave in response to the transmission signal provided from the transmitter 103 and receives the reflected wave that is generated by the transmitting wave illuminating the observed object. The omni-directional antenna element 141 provides the converter 142 with the received reflected wave in the form of an analog signal. With the omni-directional antenna element 141, it is possible to transmit the transmitting wave on the basis of the transmission signal. With the omni-directional antenna element 141, it is possible to receive the reflected wave and provide it to the converter 141 in the form of the analog signal.

The transmitting wave is not specifically limited as far as it is a wave that generates a reflected wave by illuminating the observed object. The reflected wave is not specifically limited as far as it is a wave that is generated by the transmitting wave illuminating the observed object. The transmitting wave and the reflected wave preferably include radio waves and/or sonic waves. Because the transmitting wave include radio waves and/or sonic waves, i the transmitting wave including radio wave and/or sonic wave may be transmitted to a wide area without being affected by the atmosphere, clouds, and fog or the like that attenuate visible light rays. Because the reflected wave includes radio waves and/or sonic waves, the reflected wave including radio waves and/or sonic waves may be received from a wide area without being affected by the atmosphere, clouds, and fog or the like that attenuate visible light rays. Therefore, it is possible to provide the radar device 101 capable of estimating the location of the observed object in an even wider area.

The omni-directional antenna element 141 is not specifically limited, and may be an omni-directional antenna element configured by using the prior-art antenna capable of transmitting the transmitting wave and receiving the reflected wave. If the transmitting wave and the reflected wave include radio waves, the omni-directional antenna element 141 preferably includes an antenna capable of transmitting and receiving radio waves. As such, it is possible to transmit the transmitting wave including radio waves via the omni-directional antenna element 141. It is also possible to receive the reflected wave including radio waves by using the omni-directional antenna element 141.

If the transmitting wave and the reflected wave include radio waves, the omni-directional antenna element 141 preferably includes a speaker capable of generating sonic waves and a sonic wave sensor capable of receiving sonic waves. This makes it possible to transmit the transmitting waves including sonic waves via the omni-directional antenna element 141. Further, it is possible to receive the reflected wave including sonic waves by using the omni-directional antenna element 141. The speaker and the sonic wave sensor may be configured integrally or configured separately.

The omni-directional antenna element 141 is preferably a substantially non-directive antenna element. If the transmitting wave includes radio waves, the upper limit of the gain in the substantially non-directive antenna element is preferably 1.7 or lower, more preferably 1.5 or lower, and further preferably 1.3 or lower. By setting the upper limit of the gain G as described above, it becomes even easier to transmit the transmitting wave to all azimuth directions. Further, it is possible to receive the reflected wave even more reliably, regardless of the azimuth direction of the observed object viewed from the omni-directional antenna element 141.

The omni-directional antenna element 141 is preferably able to transmit and receive the transmitting wave used in wireless communications. As such, the wireless communications may be performed using the radar device 101.

[Converter 142]

The converter 142 (reference numerals 142a, 142b, 142c, and 142d in FIG. 10) converts the reflected wave in the form of an analog signal provided from the omni-directional antenna element 141 into a digital signal. The converter 142 provides the controller 2 with this reflected wave in the form of the digital signal. With the converter 142, it is possible to provide the controller 102 with the reflected wave in the form of the digital signal suitable for the location estimation process performed in the controller 102. This allows the controller 102 to perform digital beamforming that changes the direction of the antenna by using the digital signal obtained through the conversion of the reflected wave. The converter 142 is not specifically limited, and may be a converter capable of converting an analog signal of the prior art into a digital signal.

[Amplifier]

The omni-directional antenna 104 preferably includes one or more amplifiers (not illustrated), although it is not an essential aspect. The amplifier is an amplifier that amplifies the transmission signal and/or the reflected wave R. Inclusion of the amplifier allows stronger transmitting waves T to be transmitted. In general, amplified reflected waves are easier to analyze than reflected waves that are not amplified. Therefore, the amplifier may make it easier to perform analysis of the reflected wave. The amplifier is not specifically limited, and may be an amplifier of the prior art.

The upper limit of a noise factor of the amplifier is preferably 3 or lower, more preferably 2.5 or lower, and further preferably 2 or lower. By setting the upper limit of the noise factor of the amplifier as described above, the transmitting wave with less noise may be transmitted. This may reduce influence of noise in the process of estimating the location of the observed object. By setting the upper limit of the noise factor of the amplifier as described above, it is possible to obtain an amplified reflected wave R with less noise. This may reduce the influence of noise in the process of estimating the location of the observed object.

The amplifier is preferably able to amplify the transmission signal provided by the transmitter 103. As such, the transmission signal may be amplified and provided to the omni-directional element 141. Then, it is possible to transmit a stronger transmitting wave. This makes it possible to make stronger the reflected wave generated when the transmitting wave illuminates the observed object. Therefore, it becomes easier to receive the reflected wave.

[Frequency Converter]

The omni-directional antenna 104 preferably includes a frequency converter (not illustrated), although it is not an essential aspect. The frequency converter is a frequency converter capable of converting the frequency of the transmission signal provided to the omni-directional antenna element 141 and converting the frequency of the reflected wave provided from the omni-directional antenna element 141.

In general, processing an electric signal with a higher frequency makes a configuration of a member that processes the signal more complicated, which thus reduces the cost performance. With the frequency converter, the frequency of the transmission signal processed by the transmitter 103 and/or the amplifier or the like may be made lower than the frequency of the transmitting wave. Therefore, the configuration of these components may be made simpler. This may improve the cost performance or the like of the radar device 101. With the frequency converter, the frequency of the reflected wave processed by the amplifier and/or the converter 142, or the like may be made lower than the frequency of the reflected wave. Therefore, the configuration of these components may be made simpler. This may improve the cost performance or the like of the radar device 101.

The frequency converter is not specifically limited, and may be a frequency converter of the prior art. The frequency converter may be, for example, a mixer that synthesizes a specific periodic signal $LO_C$ (this signal is a signal usually referred to as LO, but is denoted as the predetermined periodic signal $LO_C$ to discriminate it from the predetermined periodic signal in the aforementioned first embodiment) with the transmitting wave and/or the reflected wave, thereby converting the frequency of the transmitting wave and/or the reflected wave. By synthesizing the specific periodic signal $LO_C$ and the transmission signal, it is possible to convert the frequency of the transmission signal into a frequency of a sum of the specific periodic signal $LO_C$ and the frequency of the transmission signal. By synthesizing the specific periodic signal $LO_C$ and the reflected wave R, it is possible to convert the frequency of the reflected wave R into a frequency of a difference between the frequency of the specific periodic signal $LO_C$ and the frequency of the reflected wave R.

[Support Structure 105]

The support structure 105 is able to support the one or more omni-directional antennae 104. The support structure 105 is not specifically limited, and may be a support structure of the prior art. The support structure 105 is preferably able to support the one or more omni-directional antennae 104 so as to maintain a positional relationship of each of them in a predetermined positional relationship. This may make it easier to perform the location estimation process to be described below.

The support structure 105 may include one or more omni-directional antennae support structures 151 (reference numerals 151a, 151b, 151c, and 151d in FIG. 10) and a base structure 152 capable of supporting the one or more omni-directional support structures 151. The omni-directional antenna support structure 151 is a support structure capable of supporting the one or more omni-directional antennae 104. As such, it becomes even easier to maintain a positional relationship of each of the plurality of omni-directional antennae in the predetermined positional relationship.

[Flowchart]

Figure 11:
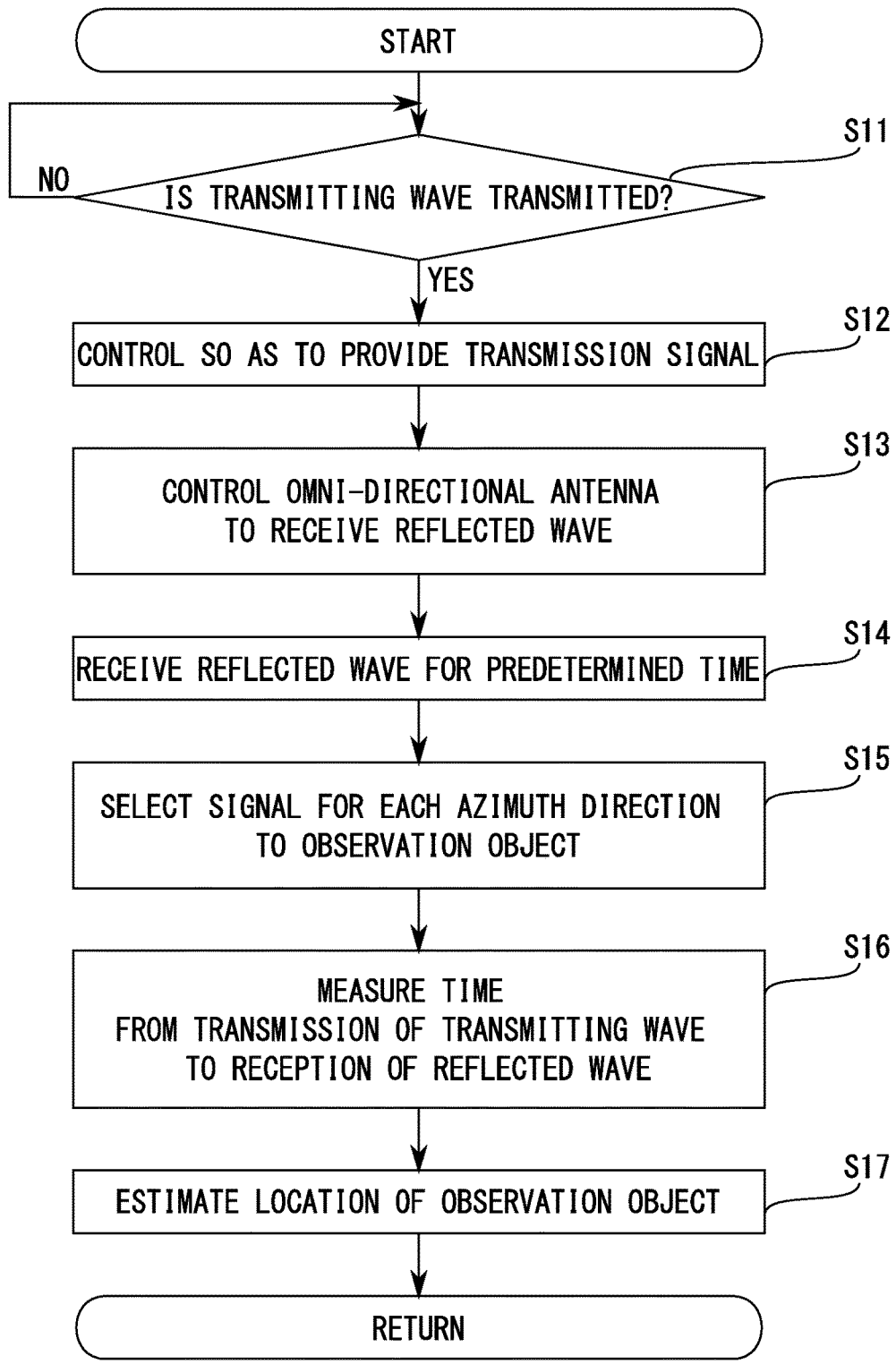
FIG. 11 is a flowchart illustrating an example of a flow of a specification process to be performed by a controller 102.

FIG. 11 is a flowchart diagram illustrating an example of a flow of the location estimation process performed by the controller 102. Hereinafter, with reference to FIG. 11, description is given of an example of a preferred procedure of the location estimation process performed by the controller 102.

[Step S11: Determine Whether or not to Transmit the Transmitting Wave]

First, the controller 102 determines whether or not to transmit the transmitting wave (step S11). If the transmitting wave is transmitted, the controller 102 shifts processing to step S12. If the transmitting wave is not transmitted, the controller 102 shifts the processing to step S11 and repeats the processing of steps S11 to S17. By determining whether or not to transmit the transmitting wave, it is possible to transmit the transmitting wave only when it is determined that the transmitting wave is to be transmitted. The process of determining whether or not to transmit the transmitting wave is not specifically limited.

If the transmitter 103 provides the omni-directional antenna 104 with the pulse wave transmission signal that causes transmission of the transmitting wave which is the pulse wave, the process of determining whether or not to transmit the transmitting wave preferably includes the process of determining that the transmitting wave is to be transmitted when the pulse wave is transmitted and determining that the transmitting wave is not to be transmitted when the pulse wave is not transmitted. This makes it possible to transmit the pulse wave that is transmitted intermittently.

If the transmitter 103 provides the omni-directional antenna 104 with the chirp wave transmission signal that causes transmission of the transmitting wave which is the chirp wave, the process of determining whether or not to transmit the transmitting wave preferably includes the process of determining that the transmitting wave is to be transmitted when the chirp wave is transmitted and determining that the transmitting wave is not to be transmitted when the chirp wave is not transmitted. This makes it possible to transmit the chirp wave that is transmitted intermittently in accordance with the chirp signal transmission signal.

The process of determining whether or not to transmit the transmitting wave preferably includes the process of determining that the transmitting wave is to be transmitted between the time when the user who uses the radar device 101 instructs the start of transmission of the transmitting wave and the time when the user instructs the stop of the transmission of the transmitting wave, and the process of determining that the transmitting wave is not to be transmitted between the time when the user who uses the radar device 101 instructs the stop of the transmission of the transmitting wave and the time when the user instructs the start of the transmission of the transmitting wave. This makes it possible to transmit the transmitting wave in response to the instruction of the user who uses the radar device 101.

[Step S12: Control so as to Provide the Transmission Signal]

The controller 102 controls the transmitter 103 so as to provide the omni-directional antenna 104 with the transmission signal that causes the transmitting wave to be transmitted (step S12). The controller 102 shifts the processing to step S5. By controlling the transmitter 103 so as to provide the omni-directional antenna 104 with the transmission signal that causes the transmitting wave to be transmitted, it is possible to transmit the transmitting wave via the omni-directional antenna 104.

The transmission signal is not specifically limited. The transmission signal includes, for example, the pulse wave transmission signal that causes the omni-directional antenna 104 to transmit the transmitting wave which is the pulse wave, the chirp transmission signal that causes the omni-directional antenna 104 to transmit the transmitting wave which is the chirp wave, and/or the frequency modulated continuous wave transmission signal that causes the omni-directional antenna 104 to transmit the transmitting wave which is the frequency modulated continuous wave.

In order to measure the time from the transmission of the transmitting wave to the reception of the reflected wave R, it is necessary to identify when the transmitting wave T that generates the reflected wave is transmitted. However, if the transmitting wave that is not frequency modulated is transmitted continuously, it is difficult to identify when the transmitting wave T that generates the reflected wave is transmitted. Therefore, if the transmitting wave that is not frequency modulated is transmitted continuously, measurement of the time from the transmission of the transmitting wave to the reception of the reflected wave R may become difficult.

Because the transmission signal includes the pulse transmission signal, the omni-directional antenna 104 is able to transmit the transmitting wave including the pulse wave. As such, by associating the transmitting wave including the pulse wave with the reflected wave, it is possible to measure the time from the transmission of the transmitting wave including the pulse wave to the reception of the reflected wave more accurately than a case where the continuous wave that is not subjected to the frequency modulation is transmitted.

Because the transmission signal includes the chirp transmission signal, the omni-directional antenna 104 is able to transmit the chirp wave. This makes it possible to measure the time from the transmission of the transmitting wave including the chirp wave to the reception of the reflected wave, by using the frequency of the reflected wave, even when the transmitting wave including the chirp wave is transmitted longer than the pulse wave.

Because the transmission signal includes the pulse wave transmission signal and/or the chirp wave transmission signal, the transmitting wave is transmitted intermittently. Therefore, the reflected wave may be easily associated with the transmitting wave that generates the reflected wave. This makes it possible to easily measure the time from the transmission of the transmitting wave to the reception of the reflected wave.

In addition, as such, the reflected wave R may be received by the omni-directional antenna 104 while the omni-directional antenna 104 is not transmitting the transmitting wave. Therefore, it is possible to receive the reflected wave without having another antenna for transmitting the reflected wave. As such, the radar device 101 may be configured to have a simpler structure than a radar device having the other antenna for receiving the reflected wave. Therefore, the cost performance and/or maintainability or the like of the radar device 101 may be improved.

Because the transmission signal includes the frequency modulated continuous wave transmission signal, the omni-directional antenna 104 is able to transmit the frequency modulated continuous wave. As such, the time from the transmission of the transmitting wave to the reception of the reflected wave may be measured by using a comparison of the frequency of the transmitting wave and the frequency of the reflected wave. Therefore, even when the transmitting wave is not a transmitting wave that is transmitted intermittently, the time from the transmission of the transmitting wave to the reception of the reflected wave may be measured. Moreover, because the transmission signal includes the frequency modulated continuous wave transmission signal, more transmitting waves may illuminate the observed object and more reflected wave may be generated.

If the transmission signal includes the frequency modulated continuous wave transmission signal, and the omni-directional antenna 104 for transmitting the transmitting wave T and the omni-directional antenna 104 for receiving the reflected wave R differ from each other, it is preferable to control the omni-directional antenna 104 that is different from the omni-directional antenna 104 for transmitting the transmitting wave T so that that omni-directional antenna 104 receives the reflected wave R. This makes it possible to transmit the transmitting wave even while receiving the reflected wave.

If the transmission signal includes the pulse wave transmission signal and/or the chirp wave transmission signal, the controller 102 preferably performs the process of controlling the omni-directional antenna 104 so as to receive the reflected wave R illustrated in step S13.

[Step S13: Control the Omni-Directional Antenna so as to Receive the Reflected Wave]

The controller 102 controls the omni-directional antenna 104 so as to receive the reflected wave (step S13). The controller 102 shifts the processing to step S14. This allows the reflected wave to be received. The process of controlling the omni-directional antenna 104 so as to receive the reflected wave is not specifically limited.

It is preferable that the process of controlling the omni-directional antenna 104 so as to receive the reflected wave include a process of controlling the omni-directional antenna 104 so as to receive the reflected wave, that omni-directional antenna 104 being the same as the omni-directional antenna 104 that transmits the transmitting wave in step S12. This allows the reflected wave to be received at the location of the omni-directional antenna 104 that transmits the transmitting wave. Therefore, a distance from the omni-directional antenna 104 to the observed object may be specified without regard to a difference between a distance from the omni-directional antenna 104 that transmits the transmitting wave to the observed object and a distance from the omni-directional antenna 104 that receives the reflected wave to the observed object. As such, the distance from the omni-directional antenna 104 to the observed object may be specified even more easily.

If the number of the omni-directional antennae 104 is two or more, it is preferable that the process of controlling the omni-directional antenna 104 so as to receive the reflected wave include the process of controlling the omni-directional antenna 104 so as to receive the reflected wave, that omni-directional antenna 104 being different from the omni-directional antenna 104 that transmits the transmitting wave T in step S12. This allows the reflected wave to be received at the omni-directional antenna 104 which is different from the omni-directional antenna 104 that transmits the transmitting wave, even when the frequency modulated transmitting wave is transmitted continuously. As such, more transmitting waves T may illuminate the observed object and more reflected waves R may be generated.

If the number of the omni-directional antennae 104 is two or more, it is preferable that the process of controlling the omni-directional antenna 4 so as to receive the reflected wave include a process of controlling the two or more omni-directional antennae 104 so as to receive the reflected wave. This makes it possible to perform a process of specifying an approximately spherical space including the location of the observed object. The process of specifying the approximately spherical location including the location of the observed object is described below in more detail with reference to FIG. 15.

If the number of the omni-directional antennae 104 is three or more, and the three or more omni-directional antennae 104 are disposed non-linearly, it is preferable that the process of controlling the omni-directional antenna 104 so as to receive the reflected wave include a process of controlling the three or more non-linearly disposed omni-directional antennae 104 so as to receive the reflected wave R. This makes it possible to perform the process of specifying the two locations including the location of the observed object. The process of specifying the two locations including the observed object is described below in more detail with reference to FIG. 16.

If the number of the omni-directional antennae 104 is four or more, and at least the one omni-directional antenna 104 of the four or more omni-directional antennae 104 is disposed so as not to be on the same plane, it is preferable that the process of controlling the omni-directional antenna 104 so as to receive the reflected wave include a process of controlling the four or more omni-directional antennae 104, of which at least the one omni-directional antenna 104 is not on the same plane, to receive the reflected wave. This makes it possible to perform the process of specifying the approximately circular space including the location of the observed object. The processing of specifying the approximately circular space including the observed object is described below in detail with reference to FIG. 15.

[Step S14: Receive the Reflected Wave for a Predetermined Time]

The controller 102 controls the one or more omni-directional antennae 104 so as to receive the reflected wave for a predetermined time (step S14). By controlling the controller 102 so as to receive the reflected wave for the predetermined time, it is possible to measure the time from the transmission of the transmitting wave until the omni-directional antenna 104 receives the reflected wave, by using the received reflected wave, and to perform the processing of estimating the location of the observed object. The predetermined time is not specifically limited, and may be, for example, time according to a transmission cycle of the pulse wave and/or the chirp waves or time according to a cycle in which the frequency modulated continuous wave repeats modulation, or the like.

Although this is not an essential aspect, if the number of the omni-directional antennae 104 is two or more, the controller 102 preferably performs a process of selecting a signal for each azimuth direction to the observed target illustrated in step S15.

[Step S15: Select a Signal for Each Azimuth Direction to the Observed Object]

The controller 102 selects a signal for each azimuth direction to the observed object (step S15). The controller 102 shifts the processing to step S16.

If the number of the omni-directional antennae 104 is two or more, it is possible to configure an array antenna by using the two or more omni-directional antennae 104. Therefore, it is possible to perform digital beamforming for selecting a signal for each azimuth direction to the observed object using a digital signal obtained by converting the reflected wave. As such, the signal may be selected by the digital beamforming to increase the gain related to the reflected wave. Therefore, the reflected wave in the direction from the observed object to the omni-directional antenna 104 may be received more reliably.

The digital beamforming for selecting a signal is used for each azimuth direction to the observed object. Therefore, even when a plurality of observed objects is in different azimuth directions, the signal may be selected for each azimuth direction to the observed object and the gain related to the reflected wave may be increased. Therefore, each reflected wave in the direction toward the omni-directional antennae 104 from each of the observed objects at the different azimuth directions may be received more reliably.

[Step S16: Measure the Time from the Transmission of the Transmitting Wave to the Reception of the Reflected Wave]

For each of the one or more observed objects where reflected waves are generated, the controller 102 measures the time from the transmission of the transmitting wave to the reception of the reflected wave by each of the omni-directional antennae 104 (step S16). The controller 102 shifts the processing to step S17. As such, the time from the transmission of the transmitting wave to the reception of the reflected wave, which is used in the process of estimating the location of the observed object, is obtained.

The process of measuring the time from the transmission of the transmitting wave to the reception of the reflected wave by each of the one or more omni-directional antennae 104 (hereinafter, also simply referred to as a "reflected wave reception time measurement process") is not specifically limited.

If the transmitting wave includes the pulse wave, it is preferable that the reflected wave reception time measurement process include the process of measuring the time from when the pulse wave is transmitted until each of the one or more omni-directional antennae 104 receives the reflected wave. This makes it possible to associate the pulse wave with the reflected wave and more accurately measure the time until the reflected wave is received than a case where the continuous wave that is not subjected to frequency modulation is transmitted.

If the transmitting wave includes the chirp wave, it is preferable that the reflected wave reception time measurement process include the process of measuring the time from when the chirp wave is transmitted until each of the one or more omni-directional antennae 104 receives the reflected wave, using the phase difference and/or the frequency difference between the chirp wave and the reflected wave. Use of the phase difference and/or the frequency difference between the chirp wave and the reflected wave R makes it possible to measure the time until the reflected wave R is received, even for the chirp wave that is transmitted for a longer time than the pulse wave. Therefore, more transmitting waves T may illuminate the observed object. Further, more reflected waves R may be generated. As such, more reflected waves may be received than a case where the transmitting wave T is the pulse wave. Therefore, the location of the observed object may be estimated more reliably.

If the transmitting wave includes the frequency modulated continuous wave, the reflected wave reception time measurement process preferably includes the process of removing the transmitting wave from the reflected wave. If the transmitting wave is transmitted continuously, the omni-directional antenna 104 may even receive the transmitting wave when receiving the reflected wave. The received transmitting wave may become noise in processing using the reflected wave. Because the reflected wave reception time measurement process includes the process of removing the transmitting wave from the reflected wave, the transmitting wave may be removed from the reflected wave, preventing the received transmitting wave from becoming noise. The process of removing the transmitting wave from the reflected wave is not specifically limited, and may be the prior-art process of removing transmitting waves from reflected waves. The process of removing the transmitting wave from the reflected wave may be, for example, a process of adding a feedback signal to the reflected wave, the feedback signal being generated by using a transmitting wave whose phase is inverted, to remove a transmitting wave that interferes with a reflected wave.

If the transmitting wave includes the frequency modulated continuous wave, it is preferable that the reflected wave reception time measurement process include the process of measuring the time from when the transmitting wave is transmitted until each of the one or more omni-directional antennae 104 receives the reflected wave, by using the comparison of the frequency of the transmitting wave and the frequency of the reflected wave. This makes it possible to measure the time until the reflected wave is received even for the frequency modulated continuous wave that is transmitted continuously. Therefore, more transmitting waves may illuminate the observed object. As such, then, more reflected waves may be generated. More reflected waves may be received than a case where the transmitting wave is the pulse wave and/or the chirp wave that is transmitted intermittently. As such, the location of the observed object may be estimated more reliably.

The generation of more reflected waves in the observed object and the measurement of the time from the transmission of the transmitting wave to the reflected wave may be achieved simultaneously by including the process of the reflected wave reception time measurement process removing the transmitting wave from the reflected wave when the transmitting wave includes the frequency modulated continuous wave and the process of measuring the time from when the transmitting wave is transmitted until each of the one or more omni-directional antennae 104 receives the reflected wave by using the comparison of the frequency of the transmitting wave and the frequency of the reflected wave. As such, more reflected waves may be received and the location of the observed object may be estimated even more reliably.

[Step S17: Estimate the Location of the Observed Object]

Turn back to FIG. 3. For each of the one or more observed objects where the reflected wave is generated, the controller 102 estimates the location of the observed object by using the time from the transmission of the transmitting wave until each of the one or more omni-directional antennae 104 receives the reflected wave R (step S17). The controller 102 shifts the processing to step S11 and repeats the processing of steps S11 to S17. This allows the location of the observed object to be estimated for each of the one or more observed objects where the reflected wave is generated. The process of estimating the location of the observed object is not specifically limited.

The time from the transmission of the transmitting wave to the reception of the reflected wave varies depending on the distance from the omni-directional antenna 104 to the observed object. Therefore, the distance from the omni-directional antenna 104 to the observed object may be measured by using the time from the transmission of the transmitting wave T to the reception of the reflected wave R.

If the number of the omni-directional antennae 104 is two or more, and the process of controlling the omni-directional antenna 104 so as to receive the reflected wave in step S13 includes the process of controlling the two or more omni-directional antennae 104 so as to receive the reflected wave, the process of estimating the location of the observed object preferably includes the process of specifying the approximately circular space including the observed object.

In a three-dimensional space, it is known that a location of a point where respective distances from two points at different locations are known is included in a circular region that has a center on a straight line passing through these two points and that is included in a plane perpendicular to the straight line. If the number of the omni-directional antennae 104 is two or more, and the process of controlling the omni-directional antenna 104 so as to receive the reflected wave in step S13 includes the process of controlling the two or more omni-directional antennae 104 so as to receive the reflected wave, each distance from each of the two or more omni-directional antennae 104 to the observed object may be specified by using the time from the transmission of the transmitting wave until each of the two or more omni-directional antennae 104 receives the reflected wave. Therefore, the approximately circular space including the observed object may be specified by using the positional relationship of the two or more omni-directional antennae 104 and the specified two or more distances.

If the number of the omni-directional antennae 104 is three or more, the three or more omni-directional antennae 104 are disposed non-linearly, and the process of controlling the omni-directional antenna 104 so as to receive the reflected wave in step S13 includes a process of controlling the three or more omni-directional antennae 104 disposed non-linearly so as to receive the reflected wave, it is preferable that the process of estimating the observed object include the process of specifying the two locations including the observed object.

In a three-dimensional space, it is known that a location of a point where respective distances from three points at different locations are known is any of two points located mutually symmetrically with respect to a plane defined by these three points. If the number of the omni-directional antennae 104 is three or more, the three or more omni-directional antennae 104 are disposed non-linearly, and the process of controlling the omni-directional antenna 104 so as to receive the reflected wave in step S13 includes the process of controlling the three or more omni-directional antennae 104 disposed non-linearly so as to receive the reflected wave, each of the distances from each of the three or more omni-directional antennae 104 to the observed object may be specified by using the time from the transmission of the transmitting wave until each of the three or more omni-directional antennae 104 receives the reflected wave. Therefore, the two locations including the observed object may be specified by using the positional relationship of the three or more omni-directional antennae 104 and the specified three or more distances.

If the number of the omni-directional antennae 104 is four or more, the four or more omni-directional antennae 104 are disposed so that at least the one omni-directional antenna 104 is not on the same plane, and the process of controlling the omni-directional antenna 104 so as to receive the reflected wave in step S13 includes a process of controlling the four or more omni-directional antennae 104 disposed so that at least the one omni-directional antenna 104 is not on the same plane so as to receive the reflected wave, it is preferable that the process of estimating the location of the observed object include the process of specifying the location of the observed object.

In this case, the four or more omni-directional antennae 104 disposed so that at least the one omni-directional antenna 104 not on the same plane receives the reflected wave. As such, the two locations including the observed object may be specified by using the time from the transmission of the transmitting wave to the reception of the reflected wave by each of the three or more omni-directional antennae 104 on the same plane. The specified two locations are in locations mutually symmetrical with respect to a plane defined by these three or more omni-directional antennae 104. The one omni-directional antenna 104, which is not coplanar, is not on this plane. Therefore, each of the distances to the two locations specified by the one omni-directional antenna 104, which are not on the same plane, are not equal to each other. Therefore, it may be specified which of the specified two locations is the observed object, by using the time from the transmission of the transmitting wave to the reception of the reflected wave by the one omni-directional antenna 104, which is not on the same plane.

<Usage Examples>

Figure 12:
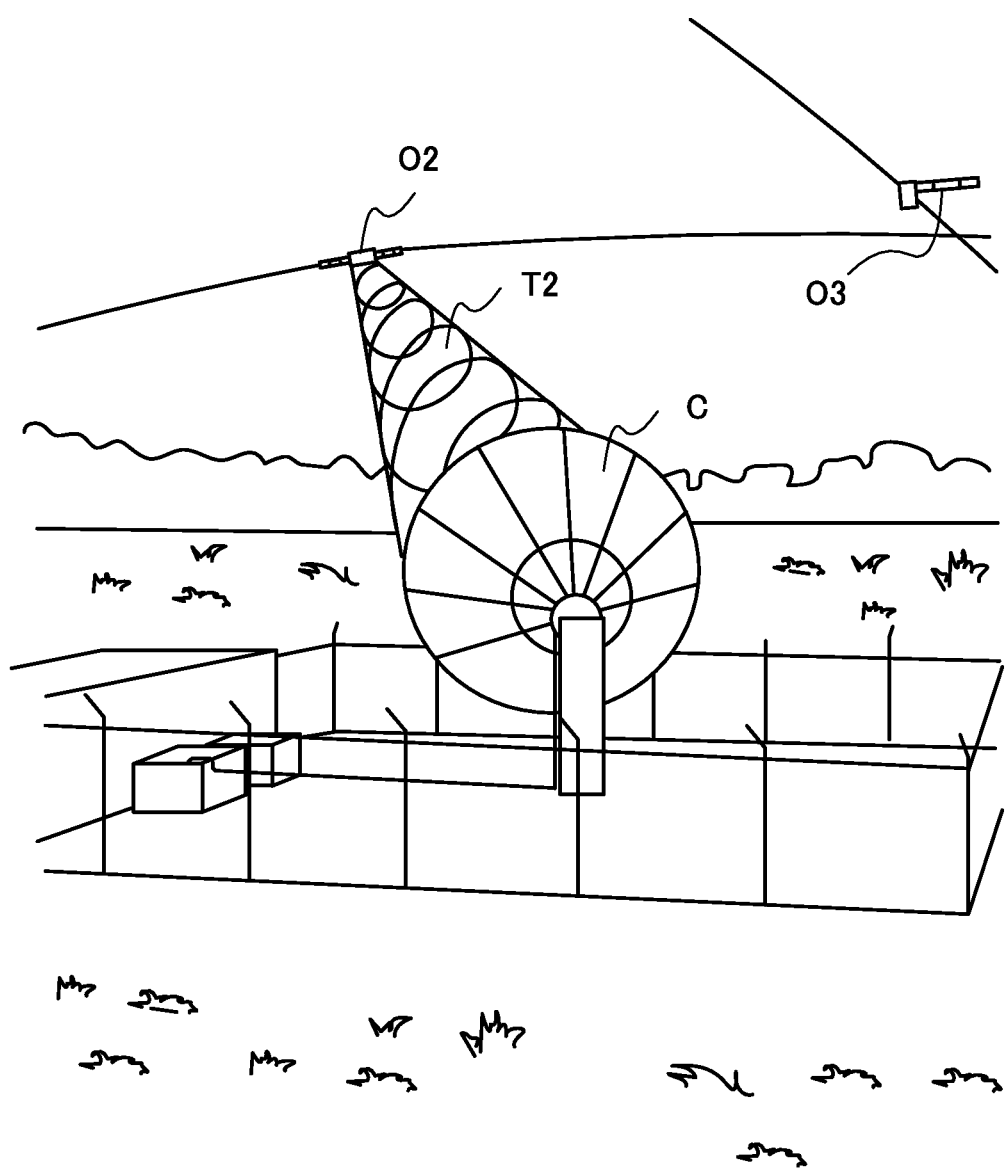
FIG. 12 is a conceptual diagram illustrating a second transmitting wave T2 transmitted from a parabola antenna C of the prior art.
Figure 13:
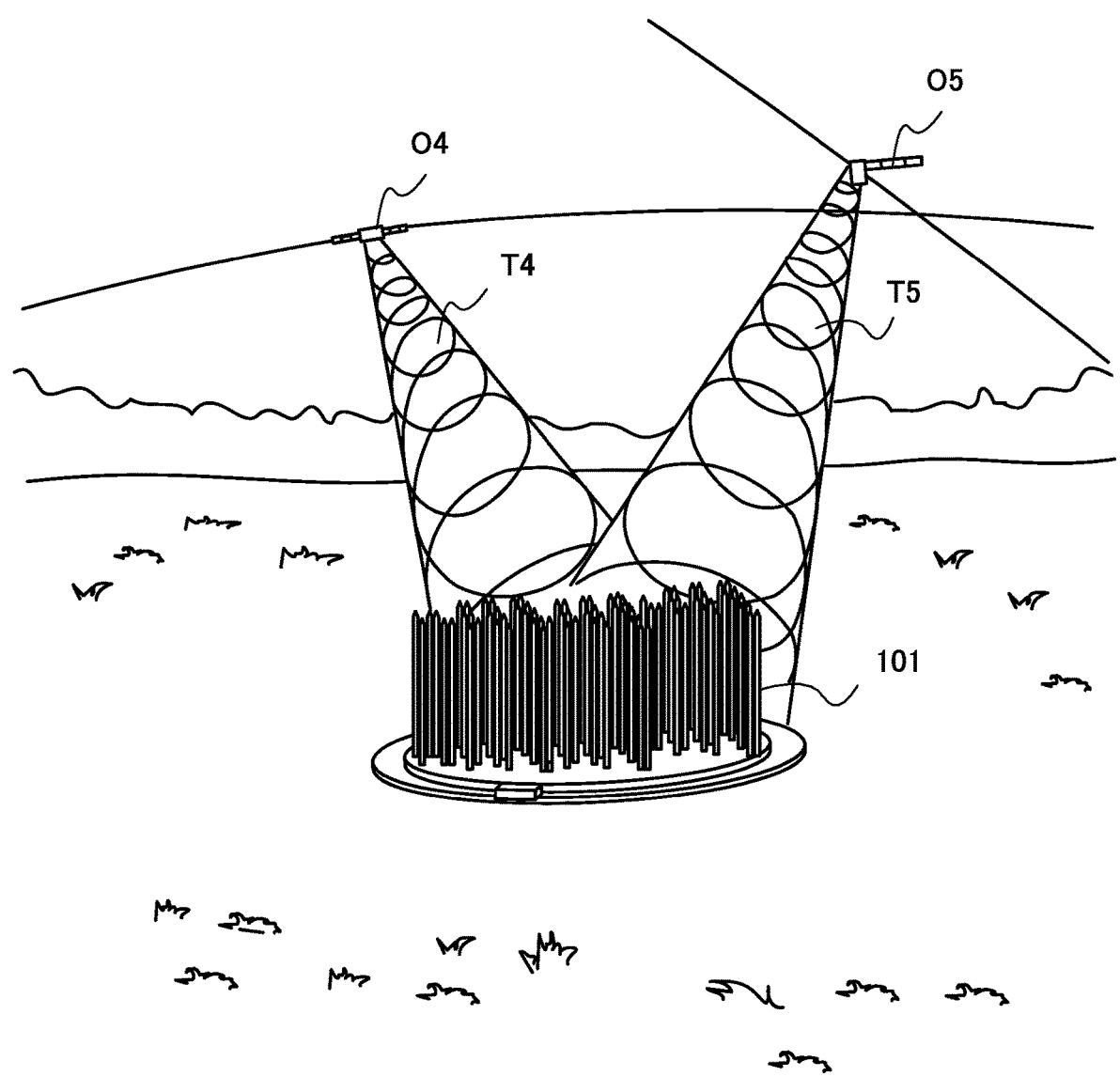
FIG. 13 is a conceptual diagram illustrating a fourth transmitting wave T4 and a fifth transmitting wave T5 transmitted from the radar device 101.
Figure 14:
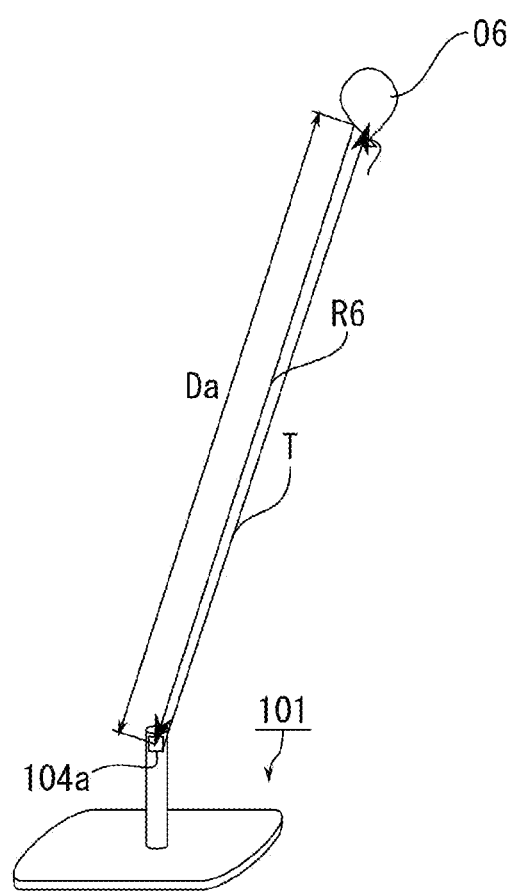
FIG. 14 is a conceptual diagram illustrating a process of specifying a distance to the observed object O1, by using time until the first reflected wave R1 is received.
Figure 15:
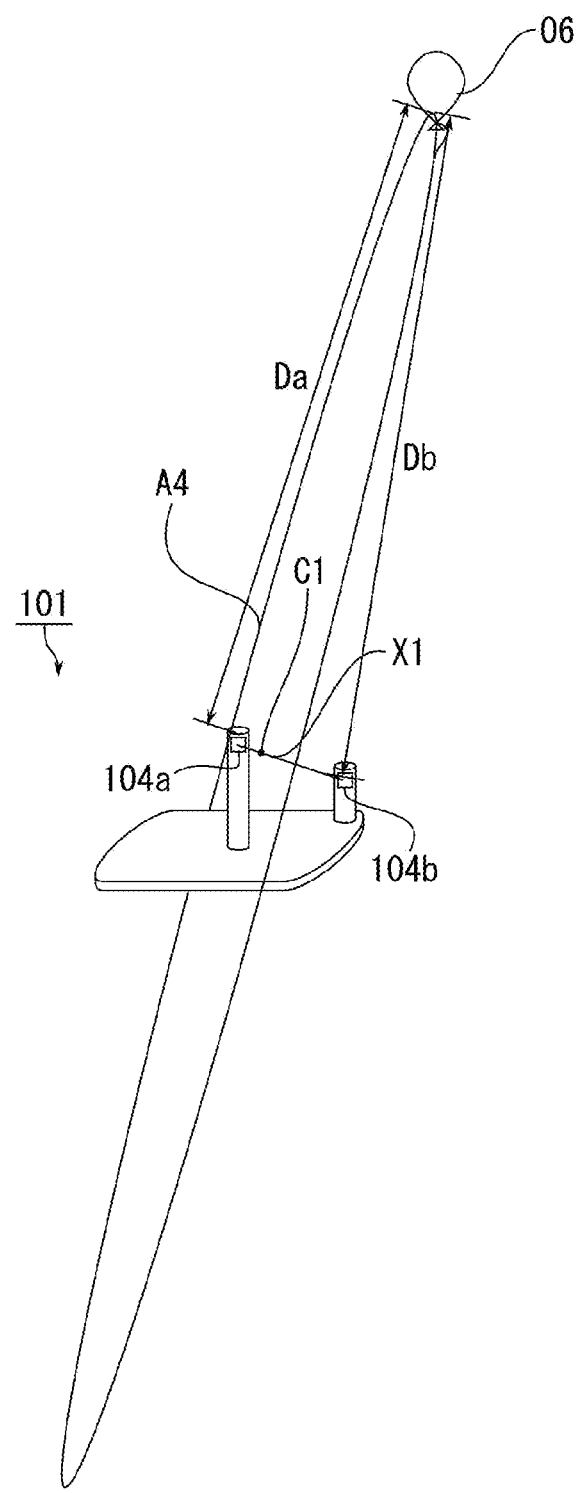
FIG. 15 is a conceptual diagram illustrating a process of specifying an approximately circular region including a location of an observed object O6, by using time until a first omni-directional antenna 104a and a second omni-directional antenna 104b each receive a sixth reflected wave R6.
Figure 16:
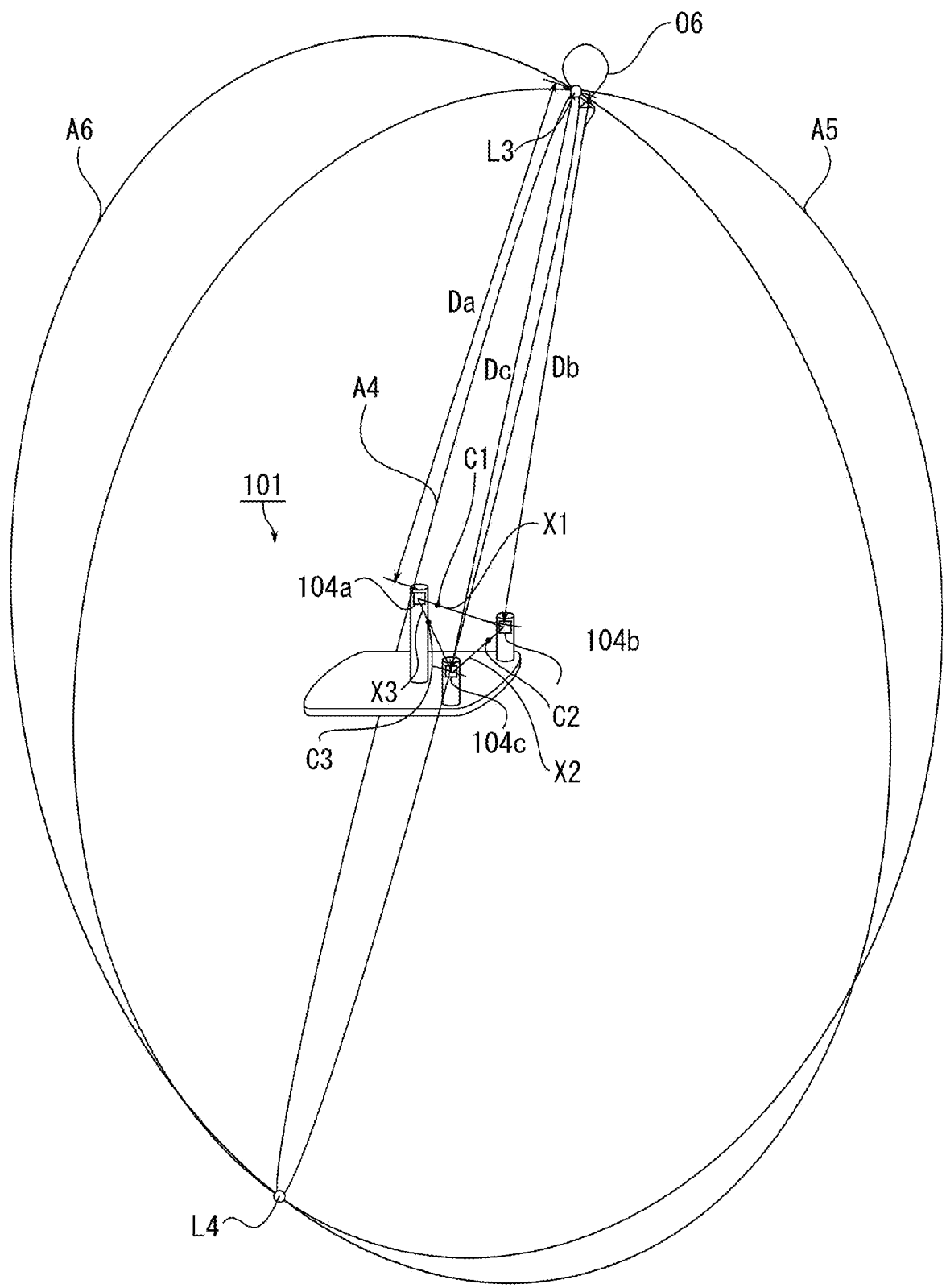
FIG. 16 is a conceptual diagram illustrating a process of specifying the two locations including the location of the observed object O6, by using time until each of the first omni-directional antenna 104a, the second omni-directional antenna 104b, and a third omni-directional antenna 104c receives the sixth reflected wave R6, and the detection of the arrival angle.
Figure 17:
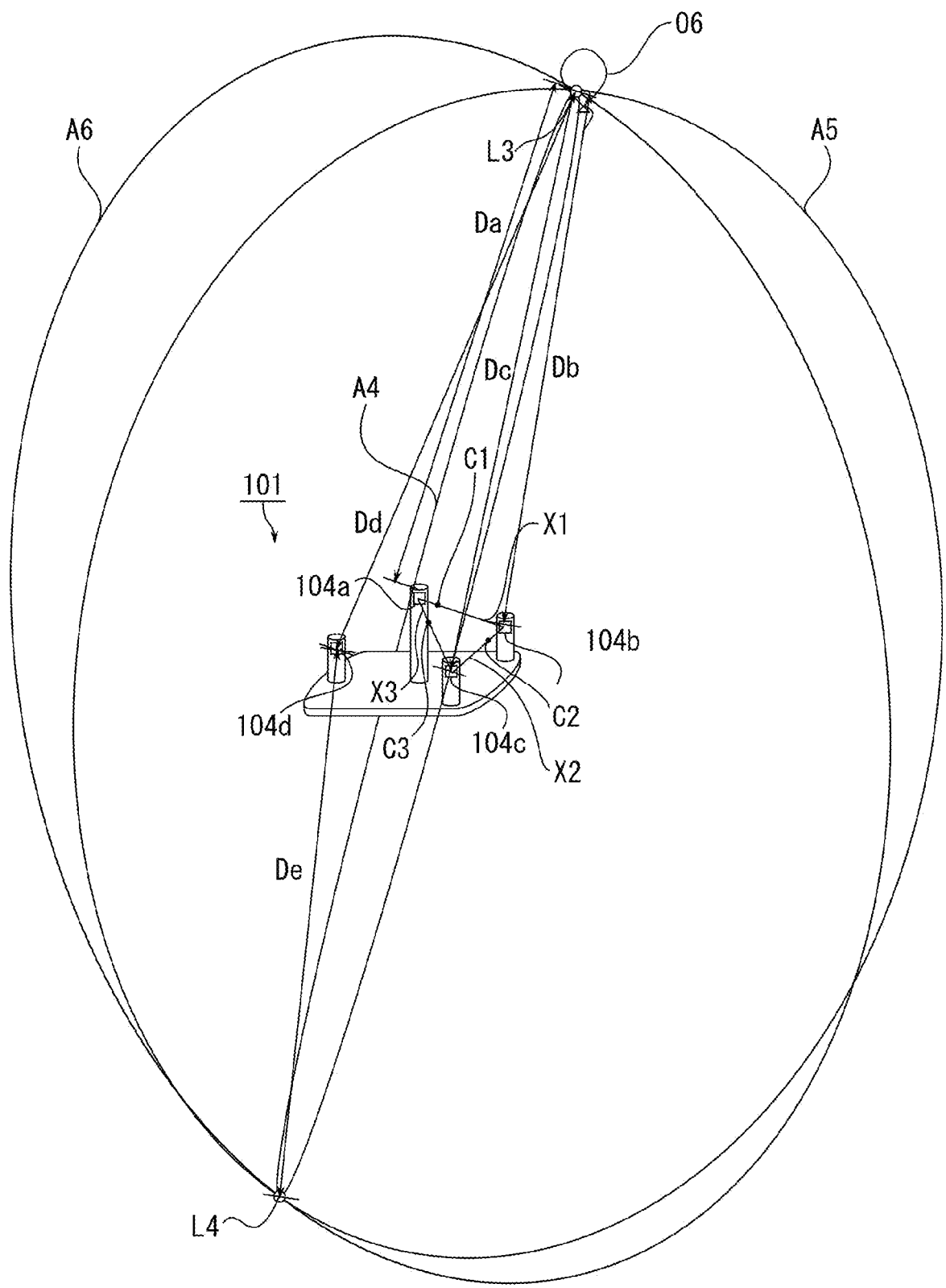
FIG. 17 is a conceptual diagram illustrating a process of specifying the location of the observed object O6, by using the time until each of the first omni-directional antenna 104a, the second omni-directional antenna 104b, the third omni-directional antenna 104c, and a fourth omni-directional antenna 104d receives the sixth reflected wave R6, and the detection of the arrival angle.

FIG. 12 is a conceptual diagram illustrating a second transmitting wave T2 transmitted from a parabola antenna C of the prior art. FIG. 13 is a conceptual diagram illustrating a fourth transmitting wave T and a fifth transmitting wave T5 transmitted from the radar device 101. FIG. 14 is a conceptual diagram illustrating a process of specifying a distance to the observed object O1 by using the time until the first reflected wave R1 is received. FIG. 15 is a conceptual diagram illustrating a process of specifying an approximately circular region including an observed object O6 by using time until each of the first omni-directional antenna 104 and the second omni-directional antenna 104b receives a sixth reflected wave R6. FIG. 16 is a conceptual diagram illustrating a process of specifying two locations including a location of the observed object O6 by using the time until each of the first omni-directional antenna 104a, the second omni-directional antenna 104b, and a third omni-directional antenna 104c receives the sixth reflected wave R6 and detection of an arrival angle. FIG. 17 is a conceptual diagram illustrating a process of specifying the location of the observed object O6 by using time until each of the first omni-directional antenna 104a, the second omni-directional antenna 104b, the third omni-directional antenna 104c, and a fourth omni-directional antenna 104d receives the sixth reflected wave R6 and the detection of the arrival angle. Hereinafter, description is given of usage examples of the radar device 101 in the present embodiment with reference to FIG. 12 to FIG. 17, where appropriate.

[Transmitting the Transmitting Wave]

The user who uses the radar device 101 instructs the controller 102 to transmit the transmitting wave T. The controller 102 controls the transmitter 103 so as to provide the omni-directional antenna 104 with the transmission signal that causes the transmitting wave T to be transmitted. The transmitter 103 provides the antenna for transmission 104 with the transmission signal. Then, the transmitting wave T is transmitted from the omni-directional antenna 104.

With reference to FIG. 12 and FIG. 13, description is given of a difference between a second transmitting wave T2 transmitted by the parabola antenna C of the prior art and a fourth transmitting wave T4 and a fifth transmitting wave T5 that are transmitted from the radar device 101 of the present embodiment.

As illustrated in FIG. 12, the prior-art parabola antenna C is used by orienting the parabola antenna C to a linear direction. Therefore, the second transmitting wave T2 transmitted by the prior-art parabola antenna C is transmitted to a direction from the parabola antenna C toward a second observed object O2. At this time, the second transmitting wave T2 does not illuminate a third observed object located in a direction different from a direction of the parabola antenna C. Therefore, the third observed object O3 generates no reflected wave. As such, it is not possible to estimate the third observed object O3.

The radar device 101 of the present embodiment of the present embodiment is able to transmit the transmitting wave in a plurality of directions that are different from each other, by the digital beamforming. Therefore, as illustrated in FIG. 13, it is possible to transmit the fifth transmitting wave T5 in a direction from the radar device 101 toward the fifth observed object O5, and simultaneously transmit the fourth transmitting wave T4 from the radar device 101 toward the fourth observed object O4. Therefore, both the fourth observed object O4 and the fifth observed object O5 may generate the reflected wave. As such, a location of the fourth observed object O4 and a location of the fifth observed object may be estimated, respectively.

[Receiving the Reflected Wave]

The controller 102 controls each of the first omni-directional antenna 104a, the second omni-directional antenna 104b, the third omni-directional antenna 104c, and the fourth omni-directional antenna 104d so as to receive the sixth reflected wave R6 generated when the transmitting wave T illuminates the first observed object O6. Each of the first omni-directional antenna 104a, the second omni-directional antenna 104b, the third omni-directional antenna 104c receives the sixth reflected wave R6.

[Measuring the Time Until the Reflected Wave is Received]

The controller 102 measures the time from when the transmitting wave T is transmitted until each of the first omni-directional antenna 104a, the second omni-directional antenna 104b, the third omni-directional antenna 104c, and the fourth omni-directional antenna 104d receives the sixth reflected wave R6.

[Estimating the Location of the Observed Object]

The controller 102 estimates the location of the sixth observed object O6 by using the time until the measured sixth reflected wave R6 is received.

[Process of Specifying the Distance from the Omni-Directional Antenna to the Observed Object]

With reference to FIG. 14, description is given of a process of specifying the distance from the omni-directional antenna 104 to the sixth observed object O6 in a case where the radar device 101 includes only the first omni-directional antenna 104a.

The transmitting wave T enters the sixth observed object O6. Then, the sixth reflected wave R6 is generated. This sixth reflected wave R6 is received by the omni-directional antenna 104a in the same direction as the transmitting wave T. The measured time until the sixth reflected wave R6 is received is defined in accordance with a first distance D1 from the first omni-directional antenna 104a to the sixth observed object O6. Therefore, use of the measured time until the sixth reflected wave R6 is received makes it possible to measure an a-th distance Da from the first omni-directional antenna 104a to the sixth observed object O6.

[Process of Specifying the Approximately Circular Space]

With reference to FIG. 15, description is given of a process of specifying an approximately circular fourth space A4 including the sixth observed object O6 in a case where the radar device 101 includes the first omni-directional antenna 104a and the second omni-directional antenna 104b.

In a three-dimensional space, it is known that a location of a point where respective distances from two points at different locations are known is included in a circular region that has a center on a straight line passing through these two points and that is included in a plane perpendicular to the straight line. It is also known that a location of a point where a distance from a predetermined location and a difference between the distance from the predetermined location and a distance from a location different from the predetermined location are known is included in the circular region that has the center on a straight line passing through these two locations and that is included in the plane perpendicular to the straight line.

It is possible to measure the a-th distance Da from the first omni-directional antenna 104a to the sixth observed object O6 by using the time from when the transmitting wave T is transmitted until the first omni-directional antenna 104a receives the sixth reflected wave R6. It is also possible to measure a distance difference between a b-th distance from the second omni-directional antenna 104b to the sixth observed object O6 and the a-th distance Da, by using information (for example, a phase difference and/or a frequency difference of each of the sixth reflected wave R6 received by the first omni-directional antenna 104a and the sixth reflected wave R6 received the second omni-directional antenna 104b, or the like) regarding a difference between the time until the first omni-directional antenna 104a receives the sixth reflected wave R6 and the time until the second omni-directional antenna 104b receives the sixth reflected wave R6. The first omni-directional antenna 104a and the second omni-directional antenna 104 b have a specific positional relationship. Therefore, by using a first line segment X1 connecting the first omni-directional antenna 104a and the second omni-directional antenna 104b, the the distance Da, and the aforementioned distance difference, it is possible to specify the approximately circular fourth space A4 having the first center C1 on a straight line extended from the line segment X1.

The process of specifying the fourth space A4 is not specifically limited, and may be, for example, a process of specifying an arrival angle of the sixth reflected wave R6 in the first omni-directional antenna 104a by using the phase difference and/or the frequency difference of each of the sixth reflected wave R6 received by the first omni-directional antenna 104a and the sixth reflected wave R6 received the second omni-directional antenna 104b as well as a calculation related to the expression (2). By specifying the arrival angle, it is possible to specify the fourth space A4 using the arrival angle and the a-th distance Da.

[Process of Specifying the Two Locations]

With reference to FIG. 16, description is given of a process of specifying a third location L3 and a fourth location L4 that include the sixth observed object O6 in a case where the radar device 101 includes the first omni-directional antenna 104a, the second omni-directional antenna 104b, and the third omni-directional antenna 104c.

Similarly to the process of specifying the approximately circulate space, it is possible to specify the approximately circular fourth space A4 by using the time until each of the first omni-directional antenna 104a and the second omni-directional antenna 104b receives the sixth reflected wave R6, or the like. It is also possible to specify an approximately circular fifth space A5 by using the second omni-directional antenna 104b and the third omni-directional antenna 104c. At this time, the fifth space A5 has a second center C2 on a straight line extended from a second line segment X2, the second line segment X2 connecting the second omni-directional antenna 104b and the third omni-directional antenna 104c. It is also possible to specify an approximately circular sixth space A6 by using the time until each of the first omni-directional antenna 104a and the third omni-directional antenna 104c receives the sixth reflected wave R6, or the like. At this time, the sixth space A6 has a third center C3 on a straight line extended from a third line segment X3, the third line segment X3 connecting the first omni-directional antenna 104a and the third omni-directional antenna 104c.

The fourth space A4, the fifth space A5, and the sixth space A6 have two intersecting points. Therefore, it is possible to specify the third location L3 and the fourth location L4 that include the sixth observed object O6, by using these intersecting points. If it is known that the location where the sixth observed object O6 is located is in an approximately semi-spherical area centered around the radar device 101, such as when the radar device 101 is installed on the ground, or the like, it is possible to determine that the location of the sixth observed object O6 is the third location L3.

[Process of Specifying the Location of the Observed Object]

With reference of FIG. 17, description is given of a process specifying the location of the sixth observed object O6 in a case where the radar device 101 includes the first omni-directional antenna 104a, the second omni-directional antenna 104b, the third omni-directional antenna 104c, and the fourth omni-directional antenna 104d.

As described in the process of specifying the two locations, if the radar device 101 includes the first omni-directional antenna 104a, the second omni-directional antenna 104b, and the third omni-directional antenna 104c, it is possible to specify the third location L3 and the fourth location L4 that include the sixth observed object O6. It is possible to measure a d-th distance Dd from the fourth omni-directional antenna 104d to the observed object, by using the time until the fourth omni-directional antenna 104d receives the sixth reflected wave R6.

The third location L3 and the fourth location L4 are in locations that are mutually symmetrical to a plane defined by the first omni-directional antenna 104a, the second omni-directional antenna 104b, and the third omni-directional antenna 104c. The fourth omni-directional antenna 104d is not on this plane. Therefore, the d-th distance Dd from the fourth omni-directional antenna 104d to the third location L3 and an e-th distance De from the fourth directional antenna 104d to the fourth location L4 differ from each other. Therefore, it is possible to determine that of the third location L3 and the fourth location L4, the third location L3 is the location of the sixth observed object O6, by using the d-th distance Dd from the fourth omni-directional antenna 104d to the observed object.

[Mounting on a Flight Vehicle]

The radar device 101 is usable as a radar device to be mounted on a flight vehicle exemplified by an unmanned aerial vehicle such as a drone, etc., a helicopter, a multicopter, a balloon, an airship, a passenger plane, and a cargo airplane, or the like.

If reflected waves are received from a wide azimuth range using the prior-art radar device that is used by being oriented linearly, a rotation mechanism that rotates the radar device may be necessary. Alternatively, it may be necessary to include a plurality of radar devices for each azimuth direction in which the reflected wave is received. Mounting the rotation mechanism and/or the plurality of radar devices on a flight vehicle may increase weight of the flight vehicle. The increased weight of the flight vehicle may degrade the performance of the flight vehicle that is exemplified by a navigation speed, a cruising distance, payload, stability during flight, or the like.

Since the radar device 101 is able to receive reflected waves from a wide azimuth range, the rotation mechanism is not necessary, and it is not necessary to include the plurality of radar devices 101. This may prevent an increase in the weight of the flight vehicle and prevent a deterioration in the performance of the flight vehicle.

[Mounting on a Vehicle]

The radar device 101 is usable as a radar device to be mounted on a vehicle exemplified by a passenger car, transport vehicle, and a service vehicle, or the like.

A location of an observed object (for example, an oncoming car, a following car, and a preceding car, or the like) in the periphery of a vehicle is estimated by means of a radar device mounted on the vehicle. By estimating the location of the observed object in the periphery of the vehicle, accidents such as a collision between the vehicle and the observed object, or the like may be prevented.

In the meantime, if the observed object in the periphery of the vehicle is a traveling vehicle, a direction from the radar device toward the observed object may change significantly in a short time. If such a location of the observed object is estimated by using a device that combines the prior-art radar device, which is used by being oriented linearly, with the rotation mechanism, there may be a case where rotations of the radar device by the rotation mechanism are not able to follow a change in the direction.

The radar device 101 may select a signal for each azimuth direction to the observed object by the digital beamforming. As such, the reflected wave may be identified even if the direction from the radar device toward the observed object changes significantly in a short time. Therefore, even if the observed object is a travelling vehicle in the periphery of the vehicle, the location of the observed object may be estimated.

[Mounting on a Man-Made Satellite]

The radar device 101 is usable as a radar device to be mounted on a man-made satellite exemplified by a communication satellite, meteorological satellite, or an observation satellite, or the like.

If reflected waves are received from a wide azimuth range using the prior-art radar device that is used by being oriented linearly, a rotation mechanism that rotates the radar device may be necessary. Alternatively, it may be necessary to include a plurality of radar devices for each azimuth direction in which the reflected wave is received. If a mechanical rotation mechanism is mounted on the man-made satellite, there may arise a problem that lubricating oil used for rotating parts evaporates due to a vacuum, a problem that reaction accompanying the rotation affects posture control of the man-made satellite, or the like. Moreover, usually, the weight of a man-made satellite to be launched using a rocket is strictly limited. As such, if the radar device is mounted on a man-made satellite, improvement of the weight related to the radar device may be called for.

The radar device 101 is able to receive the reflected wave from the wide azimuth range without using the mechanical rotation mechanism or without including the plurality of radar devices 101. This may solve the problem that the lubricating oil used for the rotating parts evaporates due to the vacuum, the problem that the reaction accompanying the rotation affects the posture control of the man-made satellite, or the like. Further, the weight of the radar device to be mounted on the man-made satellite may be improved.

[Use as a Ground Radar Base]

The radar device 101 is usable as a ground radar base to be installed on the ground. The radar device 101 may receive the reflected wave from the wide azimuth range. As such, the radar device 101 is usable as a ground radar base for estimating the location of the observed object in the wider azimuth range.

[Communication System]

Figure 18:
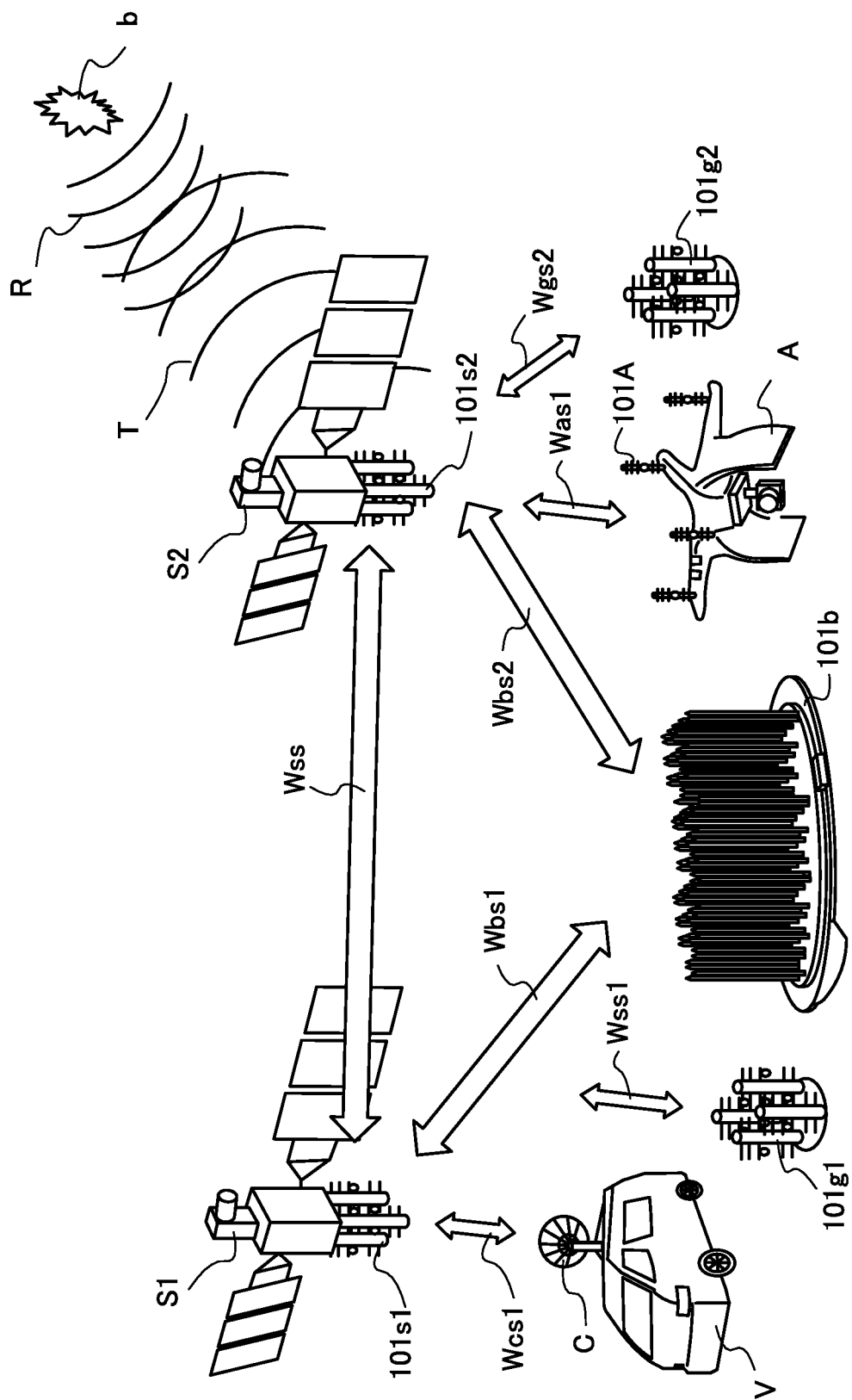
FIG. 18 is a conceptual diagram illustrating a communication system using the radar device 101.

FIG. 18 is a conceptual diagram illustrating a communication system using the radar device 101. Hereinafter, with reference to FIG. 18, description is given of usage examples in which the radar device 101 of the present embodiment is used in the communication system.

A first man-made satellite S1, a second man-made satellite S2, and an unmanned aerial vehicle A include a radar device 101S1, a radar device 101S2, and a radar device 101A, respectively, in this order. A radar device 101*b* is used as a base station. A radar device 101*g*1 and a radar device 101*g*2 are used as ground stations. A vehicle V includes the prior-art parabola antenna C.

The radar device 101 is able to orient the transmitting wave in an arbitrary direction using the digital beamforming. Therefore, even for the man-made satellite S1 that goes around in an orbit and whose position is not fixed, the radar device 101*b* used as the base station is able to orient the transmitting wave to the direction of the man-made satellite S1 from the radar device 101*b*. This allows the radar device 101*b* to transmit the transmitting wave to the radar device 101S1 included in the man-made satellite S1. Further, using the digital beamforming, the radar device 101 is able to receive the reflected wave from an arbitrary direction. Therefore, the radar device 101 is able to receive the transmitting wave from the radar device 101S1 by using the digital beamforming. Therefore, the radar device 101*b* is able to establish a communication link Wbs1 with the radar device 101S1.

Since the digital beamforming capable of orienting the array antenna in a plurality of directions is used, the radar device 101*b* is able to establish a communication link Wbs2 with the radar device 101S2 included in the man-made satellite S2, while establishing the communication link Wbs1 with the radar device 101S1. Therefore, the radar device 101*b* may act as a relay station that relays a plurality of communication links.

If a mechanical rotation mechanism is mounted on the man-made satellite, there may arise a problem that lubricating oil used for rotating parts evaporates due to a vacuum, a problem that reaction accompanying the rotation affects posture control of the man-made satellite, or the like. The digital beamforming is able to orient the transmitting wave in arbitrary direction without using the mechanical rotation mechanism. The radar device 101 including the four or more omni-directional antennae 104 disposed so that at least the one omni-directional antenna 104 is not on the same plane may orient the omni-directional antenna 104 in an arbitrary direction. Therefore, even if a positional relationship with the radar device 101*b* varies as the man-made satellite S1 orbits, the radar device 101S1 included in the man-made satellite S1 is able to continuously establish the communication links Wbs1, Wss, and Wgs1, and a communication link Wcs1, respectively, with the radar device 101*b*, 101S2, and 101*g*1, and with the parabola antenna C.

The radar device 101 is also usable as the radar device 101 while establishing the communication link. The radar device 101S2 included in the man-made satellite S2 may transmit the transmitting wave T to debris b and receive the reflected wave R, while establishing the communication links Wss, Sbs2, Was1, and Wgs2 respectively with the radar devices 101S1, 101*b*, 101A, and 101*g*2. Therefore, by using the radar device 101, the estimation of the location of the observed object and the establishment of the communication links may be performed simultaneously, without preparing another antenna for communication. Therefore, a configuration of the man-made satellite S2 may be simplified.

Although the respective embodiments of the present invention have been described above, the present invention is not limited to the aforementioned embodiments. In addition, the effects described in the aforementioned various embodiments merely recite the most preferred effects derived from the present invention, and the effects of the present invention are not limited to those described in the aforementioned various embodiments. In addition, the aforementioned various embodiments have been described in detail to explain the present invention in an easy-to-understand manner, and are not necessarily limited to those having all the described configurations. Further, for one embodiment, it is possible to replace some of a configuration thereof with a configuration of another embodiment. Moreover, for one embodiment, it is also possible to add the configuration of another embodiment to the configuration thereof.

DESCRIPTION OF THE REFERENCE NUMERALS

1 Radar device
2 Controller
3 Transmitter
4 Linear array antenna
41 Linear array antenna structure
42 Signal distributor
43 Phase shifter
44 Antenna element
45 Converter
5 Support Structure
101 Radar device
102 Controller
103 Transmitter
104 Omni-directional antenna
141 Omni-directional antenna element
142 Converter
105 Support structure
151 Omni-directional antenna support structure
152 Base structure
A Unmanned aerial vehicle
A1 First region
A2 Second region
A3 Third region
A4 Fourth region
A5 Fifth region
A6 Sixth region
b Debris
C Prior-art parabola antenna
C1 First center
C2 Second center
C3 Third center
Da a-th distance
db b-th distance
Dc c-th distance
Dd d-th distance
De e-th distance
L1 First location
L2 Second location
L3 Third location
L4 Fourth location
O1 First observed object
O2 Second observed object
O3 Third observed object
O4 Fourth observed object
O5 Fifth observed object
O6 Sixth observed object
P Prior-art antenna for transmission
R Reflected wave
R1 First reflected wave
R6 Sixth reflected wave
S1 First man-made satellite
S2 Second man-made satellite
T Transmitting wave
V Vehicle
X1 First line segment
X2 Second line segment
X3 Third line segment

The invention claimed is:

1. A radar device comprising:
a set of two or more linear array antennae; and
a controller, wherein the controller is able to perform
a process of transmitting by a first subset, composed of one or more linear array antennae from said set, a radio wave in a conical surface shape,
a process of receiving by a second subset, composed of two or more linear array antennae from said set, a reflected wave,
wherein the second subset includes a first linear array antennae also belonging to the first subset, and
wherein the reflected wave being generated by the radio wave illuminates an observed object, and
a process of estimating a location of the observed object that includes:
a process of specifying an approximately circular first region including the location of the observed object by using a reception time from transmission of the radio wave to reception of the reflected wave by the first linear array antenna and the direction of the radio wave,
a process of specifying an approximately circular second region including the location of the observed object by using the reception time along with a phase difference between reflected waves received by said first linear array antennae and said second linear array antennae, also belonging to the second subset,
a process of specifying two locations by using intersection points of the first region and the second region.

2. The radar device according to claim 1, wherein the two or more linear array antennae are disposed approximately parallel to each other in a longitudinal direction.

3. The radar device according to claim 2 wherein the controller is further able to perform a process of controlling a phase of the radio wave and a phase of the reflected wave to control a direction of the two or more linear array antennae to be a direction from the one or more linear array antennae toward the observed object.

4. The radar device according to claim 2 wherein the process of transmitting the radio wave includes a process of transmitting the radio wave intermittently.

5. The radar device according to claim 1, wherein
the number of the linear array antennae in said set is three or more,
the three or more linear array antennae are disposed approximately parallel to each other in the longitudinal direction,
the second subset is composed of three or more linear array antennae, and the process of estimating the location of the observed object includes:

a process of specifying an approximately circular third region including the location of the observed object by using said reception time along with a time from the transmission of the radio wave to a reception of the reflected wave by a third linear array antenna from the second subset, and a process of specifying the location of the observed object through a process of determining which of the two locations determined in the process of specifying two locations is included in the approximately circular third region.

6. The radar device according to claim 5 wherein the controller is further able to perform a process of controlling a phase of the radio wave and a phase of the reflected wave to control a direction of the two or more linear array antennae to be a direction from the one or more linear array antennae toward the observed object.

7. The radar device according to claim 5 wherein the process of transmitting the radio wave includes a process of transmitting the radio wave intermittently.

8. The radar device according to claim 1 wherein the controller is further able to perform a process of controlling a phase of the radio wave and a phase of the reflected wave to control a direction of the two or more linear array antennae to be a direction from the one or more linear array antennae toward the observed object.

9. The radar device according to claim 8 wherein the process of transmitting the radio wave includes a process of transmitting the radio wave intermittently.

10. The radar device according to claim 1 wherein the process of transmitting the radio wave includes a process of transmitting the radio wave intermittently.

* * * * *